United States Patent
Chong

(10) Patent No.: US 8,913,852 B2
(45) Date of Patent: Dec. 16, 2014

(54) BAND-BASED PATCH SELECTION WITH A DYNAMIC GRID

(71) Applicant: Canon Kabushiki Kaisha, Tokyo (JP)

(72) Inventor: Eric Wai-Shing Chong, Carlingford (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/705,043

(22) Filed: Dec. 4, 2012

(65) Prior Publication Data

US 2013/0148912 A1    Jun. 13, 2013

(30) Foreign Application Priority Data

Dec. 8, 2011    (AU) ................................ 2011253913

(51) Int. Cl.
*G06K 9/32* (2006.01)
*G06T 7/00* (2006.01)

(52) U.S. Cl.
CPC ............ *G06T 7/0024* (2013.01); *G06K 9/3275* (2013.01)
USPC ........... 382/294; 382/276; 382/293; 382/274; 382/162

(58) Field of Classification Search
CPC . H04N 1/6033; H04N 1/6052; H04N 1/6055; G06T 7/0024; G06T 7/0026; G06T 7/0028; G06T 7/0034; G06T 7/0036; G06T 7/0038
USPC ........... 382/162, 274, 276, 293, 294; 358/1.9, 358/518
See application file for complete search history.

(56) References Cited

U.S. PATENT DOCUMENTS

| | | | |
|---|---|---|---|
| 6,252,975 B1 | 6/2001 | Bozdagi et al. | |
| 7,231,076 B2 | 6/2007 | Fu et al. | |
| 7,382,897 B2 | 6/2008 | Brown et al. | |
| 8,325,396 B2 * | 12/2012 | Kishimoto | 358/518 |
| 2008/0019611 A1 | 1/2008 | Larkin et al. | |
| 2011/0267629 A1 * | 11/2011 | Fan et al. | 358/1.9 |
| 2011/0304863 A1 * | 12/2011 | Shibuya | 358/1.9 |
| 2012/0092701 A1 * | 4/2012 | Wang et al. | 358/1.15 |
| 2012/0206745 A1 * | 8/2012 | Shibuya | 358/1.9 |

* cited by examiner

*Primary Examiner* — Ali Bayat
(74) *Attorney, Agent, or Firm* — Canon U.S.A., Inc., IP Division

(57) ABSTRACT

A method of selecting a plurality of patches (e.g., 1040) within a region of a page (e.g., 1010), for use in image alignment, is disclosed. One or more candidate image alignment patches distributed across a region of the page are determined, based on content in the page region, each candidate patch being associated with a feature strength value. A distribution of grid nodes is applied to the page region, at least one attribute of the distribution of grid nodes being dynamically adjusted according to the distribution of the candidate patches across the page region. A corresponding patch from the distribution of candidate patches is selected for each of a plurality of the grid nodes, wherein each of the selected patches is selected based on proximity of the selected patch to a corresponding grid node.

11 Claims, 16 Drawing Sheets

BAND-BASED PATCH SELECTION WITH A DYNAMIC GRID

REFERENCE TO RELATED PATENT APPLICATION(S)

This application claims the benefit under 35 U.S.C. §119 of the filing date of Australian Patent Application No. 2011253913, filed 8 Dec. 2011, hereby incorporated by reference in its entirety as if fully set forth herein.

FIELD OF INVENTION

The present invention relates generally to alignment of images and, in particular, to identifying points and regions in images that are suitable for image alignment. The present invention also relates to a method and apparatus for selecting a plurality of patches within a region of a page, for use in image alignment. The present invention also relates to a computer program product including a computer readable medium having recorded thereon a computer program for selecting a plurality of patches within a region of a page for use in image alignment.

DESCRIPTION OF BACKGROUND ART

There is a general need for measuring output quality of a printing system. Results from such quality measurement may be used to fine-tune and configure parameters of the printing system for improved performance. Traditionally, quality measurement has been performed in an offline fashion through manual inspection of an output print from the printing system.

With ever increasing printing speeds and volumes, the need for automated real-time detection of print defects to maintain print quality has increased. Timely identification of print defects can allow virtually immediate corrective action, such as re-printing, to be taken, which in turn reduces waste in paper and ink or toner, while improving efficiency. Some detection systems can operate independent of user or operator input, and may be considered automatic detection systems.

A number of automatic print defect detection systems have been developed. In some arrangements, the systems involve the use of an image acquisition device, such as a CCD (charge-coupled device) camera, to capture or scan an image of a document printout (also referred to as an output print). The scan image is then compared to an image (referred to as the original image) of an original source input document. Discrepancies identified during the comparison can be flagged as print defects.

Real-time print defect detection for high volume printing is an exceptionally challenging problem because defect detection requires very accurate image alignment between the scan image and the original image, and a very high processing speed. Some existing print defect detection methods are unsuitable for real-time processing because the methods are too slow. Other methods are insufficiently accurate and are sensitive to noise and distortion. The noise and distortion either results in a high rate of false defect detections, or a coarse detection method, where only large defects are detected.

SUMMARY OF THE INVENTION

It is an object of the present invention to substantially overcome, or at least ameliorate, one or more disadvantages of existing arrangements.

Disclosed are arrangements, referred to as Adaptive Print Verification (APV) arrangements, which identify and select suitable image locations within an original source document image, in order to establish correspondence with a digitally captured image of a printed source document. The arrangements enable accurate image comparison to be performed in real-time for the purpose of print defect detection.

According to one aspect of the present disclosure there is provided a method of selecting a plurality of patches within a region of a page, for use in image alignment, said method comprising:

determining one or more candidate image alignment patches distributed across a region of the page, based on content in the page region, each candidate patch being associated with a feature strength value;

applying a distribution of grid nodes to the page region, at least one attribute of the distribution of grid nodes being dynamically adjusted according to the distribution of the candidate patches across the page region; and selecting a corresponding patch from the distribution of candidate patches for each of a plurality of the grid nodes, wherein each of the selected patches is selected based on proximity of the selected patch to a corresponding grid node.

According to another aspect of the present disclosure there is provided an apparatus for selecting a plurality of patches within a region of a page, for use in image alignment, said apparatus comprising:

means for determining one or more candidate image alignment patches distributed across a region of the page, based on content in the page region, each candidate patch being associated with a feature strength value;

means for applying a distribution of grid nodes to the page region, at least one attribute of the distribution of grid nodes being dynamically adjusted according to the distribution of the candidate patches across the page region; and means for selecting a corresponding patch from the distribution of candidate patches for each of a plurality of the grid nodes, wherein each of the selected patches is selected based on proximity of the selected patch to a corresponding grid node.

According to still another aspect of the present disclosure there is provided a system for selecting a plurality of patches within a region of a page, for use in image alignment, said system comprising:

a memory for storing data and a computer program;

a processor coupled to said memory for executing a computer program, said computer program comprising instructions for:

determining one or more candidate image alignment patches distributed across a region of the page, based on content in the page region, each candidate patch being associated with a feature strength value;

applying a distribution of grid nodes to the page region, at least one attribute of the distribution of grid nodes being dynamically adjusted according to the distribution of the candidate patches across the page region; and selecting a corresponding patch from the distribution of candidate patches for each of a plurality of the grid nodes, wherein each of the selected patches is selected based on proximity of the selected patch to a corresponding grid node.

According to still another aspect of the present disclosure there is provided a computer readable medium having a computer program recorded thereon for selecting a plurality of patches within a region of a page, for use in image alignment, said program comprising:

code for determining one or more candidate image alignment patches distributed across a region of the page, based on content in the page region, each candidate patch being associated with a feature strength value;

code for applying a distribution of grid nodes to the page region, at least one attribute of the distribution of grid nodes being dynamically adjusted according to the distribution of the candidate patches across the page region; and code for selecting a corresponding patch from the distribution of candidate patches for each of a plurality of the grid nodes, wherein each of the selected patches is selected based on proximity of the selected patch to a corresponding grid node.

Other aspects of the invention are also disclosed.

BRIEF DESCRIPTION OF THE DRAWINGS

One or more embodiments of the present invention will now be described with reference to the following drawings, in which.

DETAILED DESCRIPTION OF EMBODIMENTS OF THE INVENTION

Figure 1:
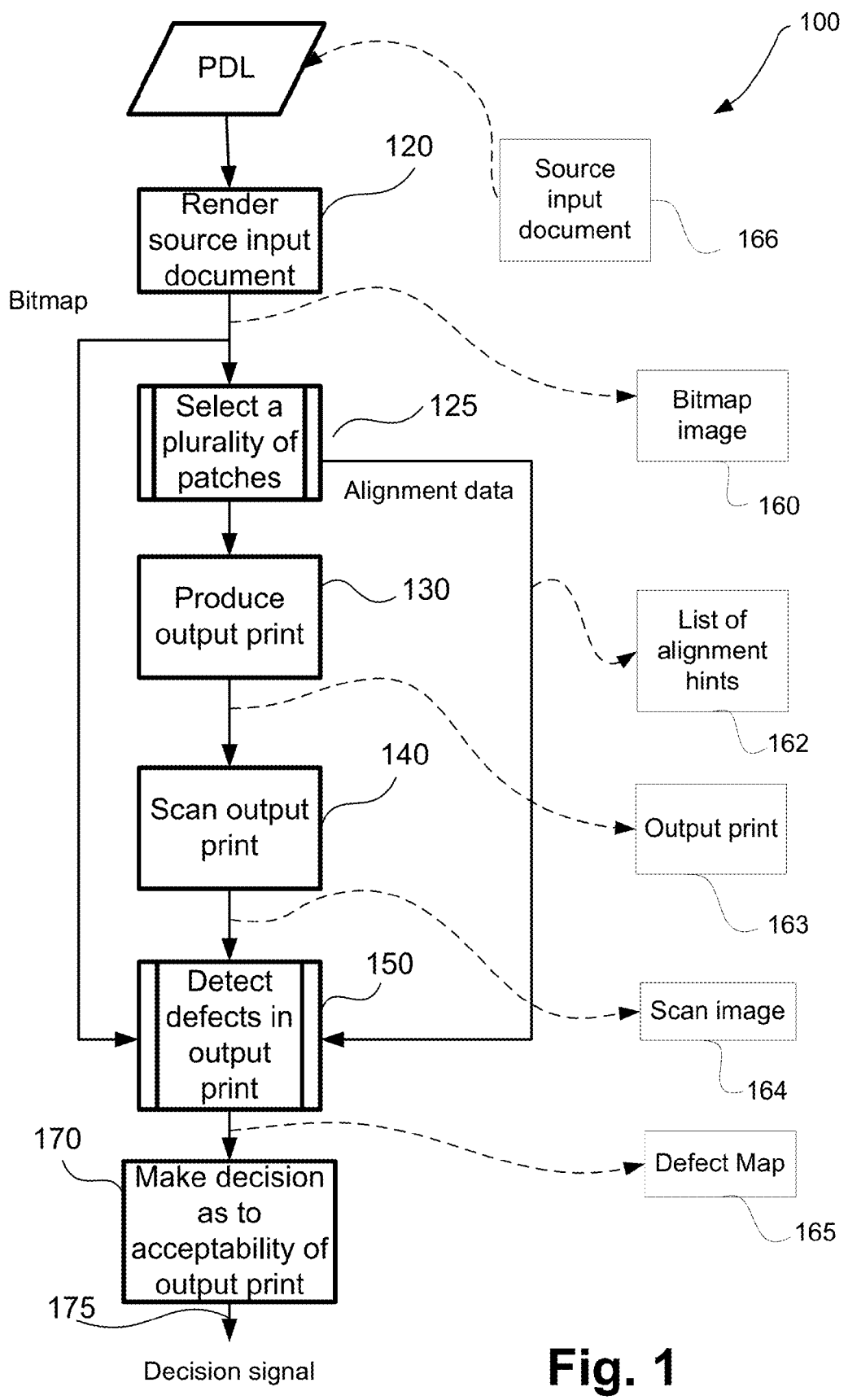
FIG. 1 is a top-level flow-chart showing a method of determining unexpected differences in a printed page.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of devices which may form public knowledge through their use. Such discussions should not be interpreted as a representation by the present inventor(s) or the patent applicant that such devices in any way form part of the common general knowledge in the art.

Figure 3:
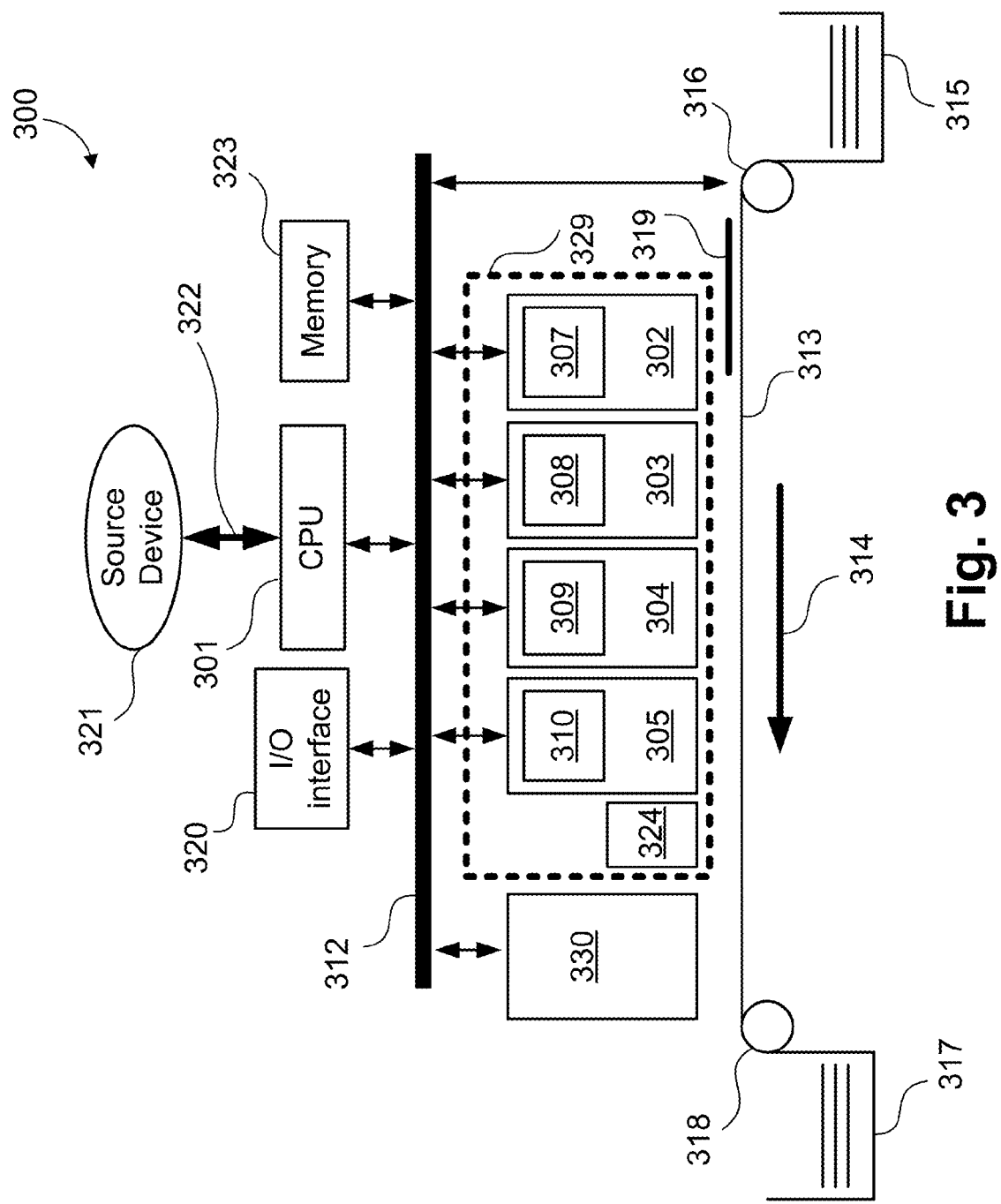
FIG. 3 is a diagrammatic overview of a print system on which the method of FIG. 1 may be practiced.

With reference to FIG. 1, an output print 163 of a print step 130 performed by a print system 300, as seen in FIG. 3, will not, in general, precisely reflect an associated source input document 166. This is because the print step 130, through which the source input document 166 is processed to produce output print 163, introduces some changes to the source input document 166 by virtue of the physical characteristics of a print engine 329 and associated movement and operations inside the print system 300. Furthermore, if the source input document 166 is compared with a scan image 164 of the output print 163, the physical characteristics of a scan step 140 by which the scan image 164 is formed also contribute changes to the source input document 166. As a result of such cumulative changes, a direct comparison between the source input document 166 and the scan image 164 is unsuitable for assessing the quality of the output print 163. In order to effectively assess the quality of the output print 163, the changes may be accounted for before the source input document 166 is compared to the scan image 164. In going from the source input document 166 to the scan image 164, each pixel in the source input document 166 is expected to undergo changes or transformations in both the intensity domain and in the spatial domain.

Intensity transformations are mainly caused by physical characteristics of the various processes through which the source input document 166 passes in producing the output print 163. Intensity transformations tend to produce expected differences and are dependent on operating conditions of the print system 300. Those operating conditions are often represented using a set of parameters in the form of a printer model.

Spatial transformations are mainly caused by mechanical movements inside the print system 300. Spatial transformations may severely affect pixel placement accuracy on a print medium and presents a major challenge to real-time print output checking.

There may also be further differences between the scan image 164 and the source input document 166, which are not accounted for by the transformations that occur within the print step 130 and the scan step 140. Such further differences are referred to as unexpected differences, and these can be amenable to corrective action. The unexpected differences are also referred to as "print defects".

The disclosed Adaptive Print Verification (APV) arrangements discriminate between expected and unexpected differences by dynamically adapting to the transformations that occur within the print step 130 and the scan step 140. By generating an "expected print result" in accordance with the transformations, it is possible to check that the output meets expectations with a reduced danger of falsely detecting an otherwise expected change as a defect (known as "false positives").

In one of the disclosed APV arrangements, the output print 163 produced by the print step 130 of the print system 300 from the source document 166 is scanned to produce digital representation 164 (hereinafter referred to as a "scan image") of the output print 163. In order to detect print errors in the output print 163, a set of parameters which model characteristics of the print mechanism of the print system 300 are firstly determined, and values for the parameters are determined based on operating condition data for at least a part of the print system 300. The operating condition data may be determined from the print system 300 itself or from other sources, such as for example, external sensors adapted to measure environmental parameters such as humidity and/or temperature in which the print system 300 is located. The value associated with each of the parameters is used to generate, by modifying a rendering 160 of the source document 166, an expected digital representation of the output print 163. The expected digital representation takes into account the physical characteristics of the print system 300, thereby effectively compensating for output errors associated with operating conditions of the print system (these output errors being expected differences) in the intensity domain. The generated expected digital representation is then aligned to the scan image 164 to remove any spatial transformations caused during printing or scanning. The aligned expected digital representation is compared to the scan image 164 of the output print 163 in order to detect unexpected differences (i.e. differences not attributable to the physical characteristics of the print system 300 or spatial transformations caused during printing or scanning) these being identified as print errors in the output of the print system 300.

Figure 13A:
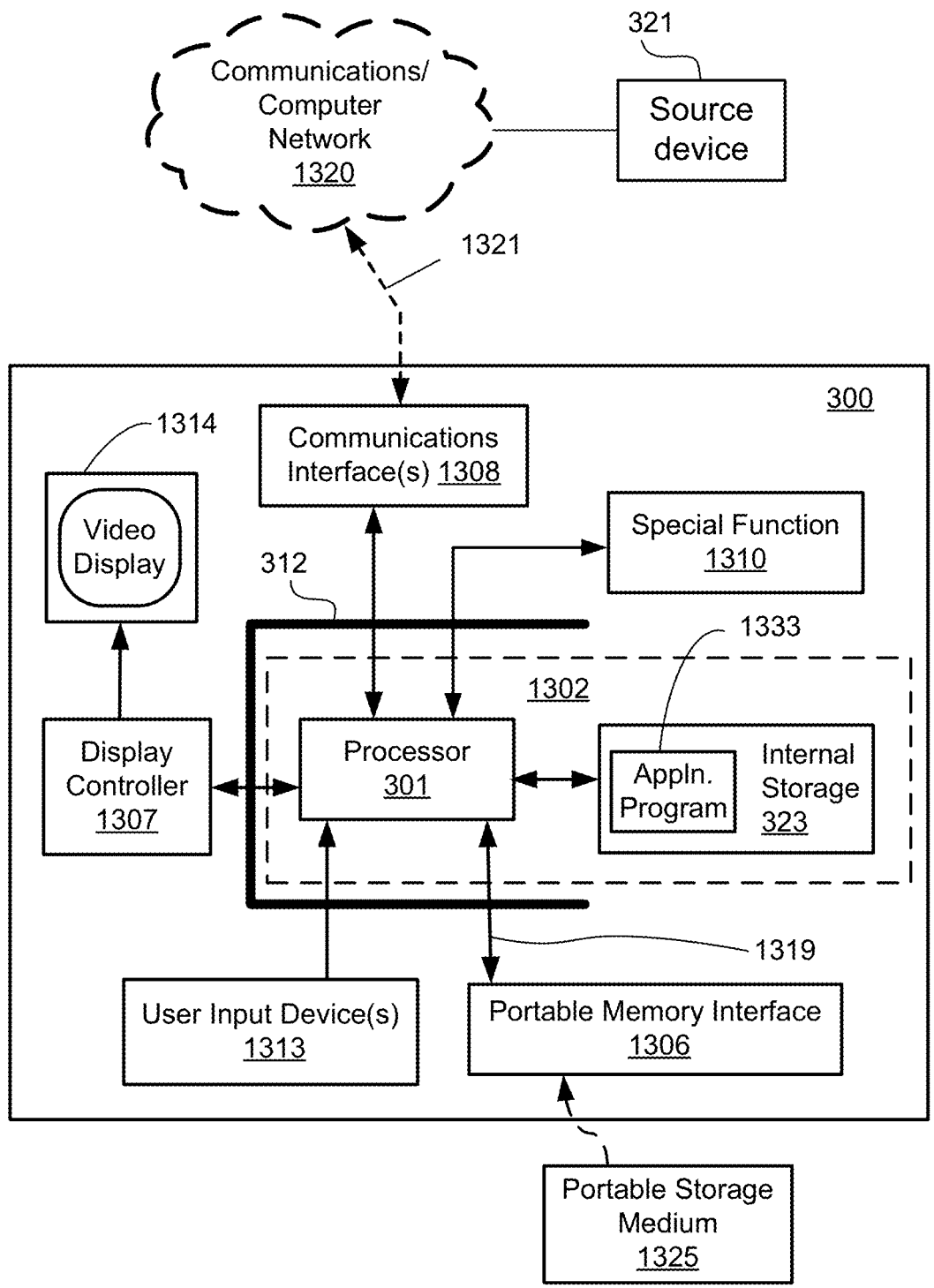
FIGS. 13A and 13B collectively form a schematic block diagram representation of an electronic device upon which described arrangements can be practiced.
Figure 13B:
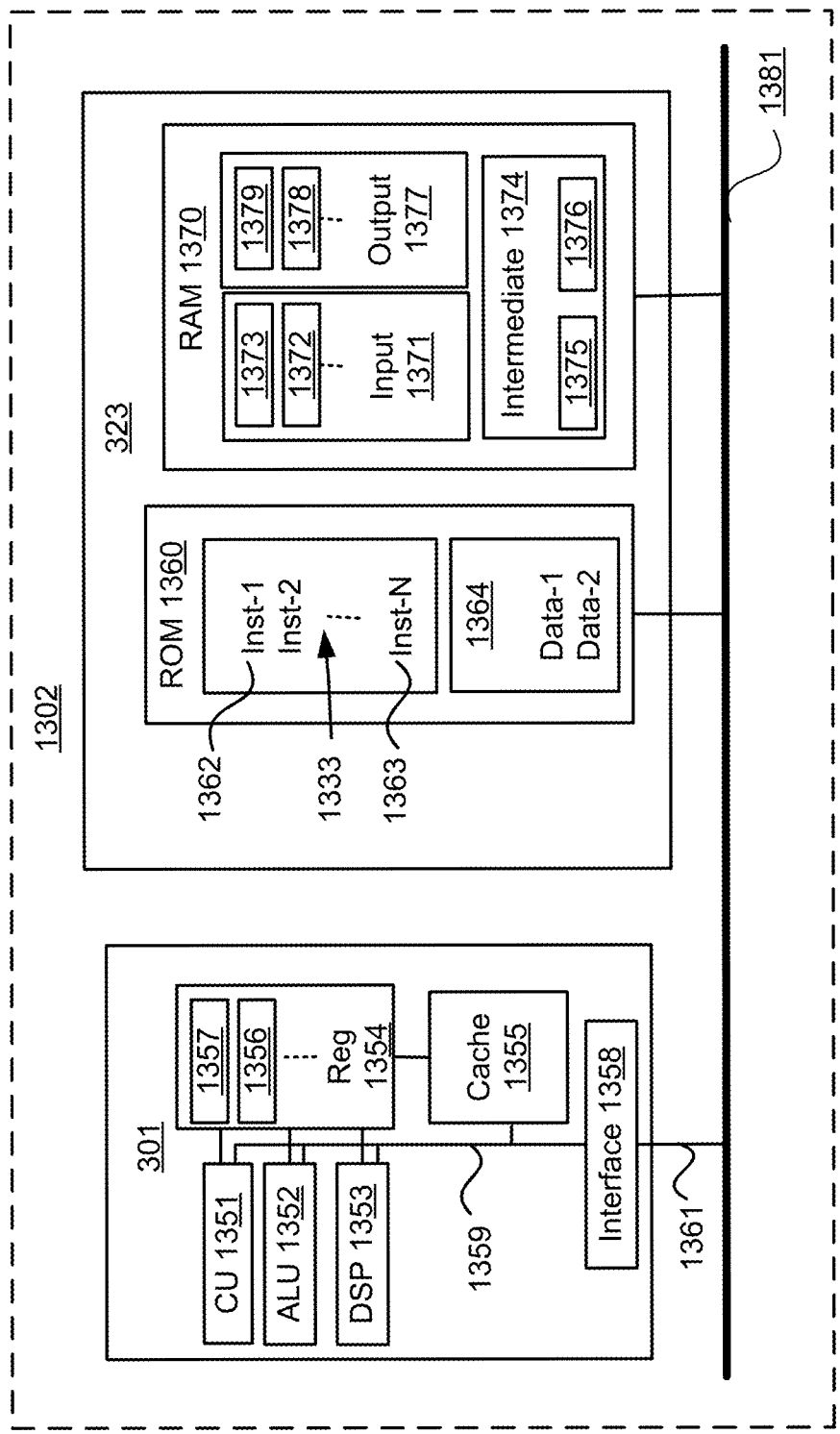

FIG. 3 is a diagrammatic overview of the components of the print system 300 on which method 100 of FIG. 1 may be practiced. An expanded depiction is shown in FIGS. 13A and 13B. In particular, FIG. 3 is a schematic block diagram of the print system 300 with which the arrangements may be practiced. The print system 300 comprises a central processing unit 301 connected to four chromatic image forming units 302, 303, 304, and 305. For ease of description, chromatic colourant substances are each referred to simply as respective colour space—"colourant". In the example depicted in FIG. 3, an image forming unit 302 dispenses cyan colourant from a reservoir 307, an image forming unit 303 dispenses magenta colourant from a reservoir 308, an image forming unit 304 dispenses yellow colourant from a reservoir 309, and an image forming unit 305 dispenses black colourant from a reservoir 310. In this example, there are four chromatic image forming units, creating images with cyan, magenta, yellow, and black (known as a CMYK printing system). Printers with less or more chromatic image forming units and different types of colourants are also available.

Central processing unit 301 communicates with the four image forming units 302-305 by a data bus 312. Using the data bus 312, the central processing unit 301 may receive data from, and issue instructions to, (a) the image forming units 302-305, as well as (b) an input paper feed mechanism 316, (c) an output visual display and input control user interface 320, and (d) a memory 323 used to store information needed by the print system 300 during its operation. The central processing unit 301 also has a link or interface 322 to a device 321 that acts as a source of data to print. The data source 321 may, for example, be a personal computer, the Internet, a Local Area Network (LAN), or a scanner, etc., from which the central processing unit 301 receives electronic information to be printed, this electronic information being the source document 166 in FIG. 1. The data to be printed may be stored in the memory 323. Alternatively, the data source 321 to be printed may be directly connected to the data bus 312.

When the central processing unit 301 receives data to be printed, instructions are sent to the input paper feed mechanism 316. The input paper feed mechanism 316 takes a sheet of paper 319 from an input paper tray 315, and places the sheet of paper 319 on a transfer belt 313. The transfer belt 313 moves in the direction of an arrow 314 (from right to left horizontally in FIG. 3), to cause the sheet of paper 319 to sequentially pass by each of the image forming units 302-305. As the sheet of paper 319 passes under each image forming unit 302, 303, 304, 305, the central processing unit 301 causes the image forming unit 302, 303, 304, or 305 to write an image to the sheet of paper 319 using a particular colourant of the image forming unit in question. After the sheet of paper 319 has passed under all of the image forming units 302-305, a full colour image will have been placed on the sheet of paper 319.

For the case of a fused toner printer, the sheet of paper 319 then passes by a fuser unit 324 that affixes the colourants to the sheet of the paper 319. The image forming units and the fusing unit 324 are collectively known as a print engine 329. The output print 163 of the print engine 329 may then be checked by a print verification unit 330 (also referred to as a print defect detector system). The sheet of paper 319 is then passed to a paper output tray 317 by an output paper feed mechanism 318.

The printer architecture in FIG. 3 is for illustrative purposes only. Many different printer architectures may be adapted for use by the disclosed arrangements. In one example, the arrangements may take the action of sending instructions to the print system 300 to reproduce the output print 163 if one or more errors are detected.

FIGS. 13A and 13B collectively form a schematic block diagram representation of the print system 300 in more detail. As seen in FIGS. 13A and 13B, the print system 300 comprises embedded components, upon which methods to be described are desirably practiced. The print system 300 in the arrangement of FIGS. 13A and 13B is a printer in which processing resources are limited. Nevertheless, one or more of the APV functional processes may alternately be performed on higher-level devices such as desktop computers, server computers, and other such devices with significantly larger processing resources, which are connected to the printer.

As seen in FIG. 13A, the print system 300 comprises an embedded controller 1302. Accordingly, the print system 300 may be referred to as an "embedded device." In the present example, the controller 1302 has the central processing unit (or "processor") 301 which is bi-directionally coupled to the memory (internal storage module) 323 (see FIG. 3). The memory 323 may be formed from non-volatile semiconductor read only memory (ROM) 1360 and semiconductor random access memory (RAM) 1370, as seen in FIG. 13B. The RAM 1370 may be volatile, non-volatile or a combination of volatile and non-volatile memory.

The print system 300 includes a display controller 1307 (which is an expanded depiction of the output visual display and input controls 320), which is connected to a video display 1314, such as a liquid crystal display (LCD) panel or the like. The display controller 1307 is configured for displaying graphical images on video display 1314 in accordance with instructions received from the embedded controller 1302, to which the display controller 1307 is connected.

The print system 300 also includes user input devices 1313 (which is an expanded depiction of the output visual display and input controls 320) which are typically formed by keys, a keypad or like controls. In some arrangements, the user input devices 1313 may include a touch sensitive panel physically associated with the display 1314 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 13A, the print system 300 also comprises a portable memory interface 1306, which is coupled to the processor 301 via a connection 1319. The portable memory interface 1306 allows a complementary portable memory device 1325 to be coupled to the print system 300 to act as a source or destination of data or to supplement the memory (or internal storage module) 323. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The print system 300 also has a communications interface 1308 to permit coupling of the print system 300 to a computer or communications network 1320 via a connection 1321. The connection 1321 may be wired or wireless. For example, the connection 1321 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like. The source device 321 may, as in the present example, be connected to the processor 301 via the network 1320.

The print system 300 is configured to perform some or all of the APV sub-steps in the method 100 of FIG. 1. The embedded controller 1302, in conjunction with the print engine 329, the print verification unit 330 which are depicted by a special function unit 1310, is provided to perform that method 100. The special function unit 1310 is connected to the embedded controller 1302.

The APV methods described hereinafter may be implemented using the embedded controller 1302, where the processes of FIGS. 1-2, 4-12, and 15 may be implemented as at least one or more APV software application program 1333 executable within the embedded controller 1302.

Figure 14:
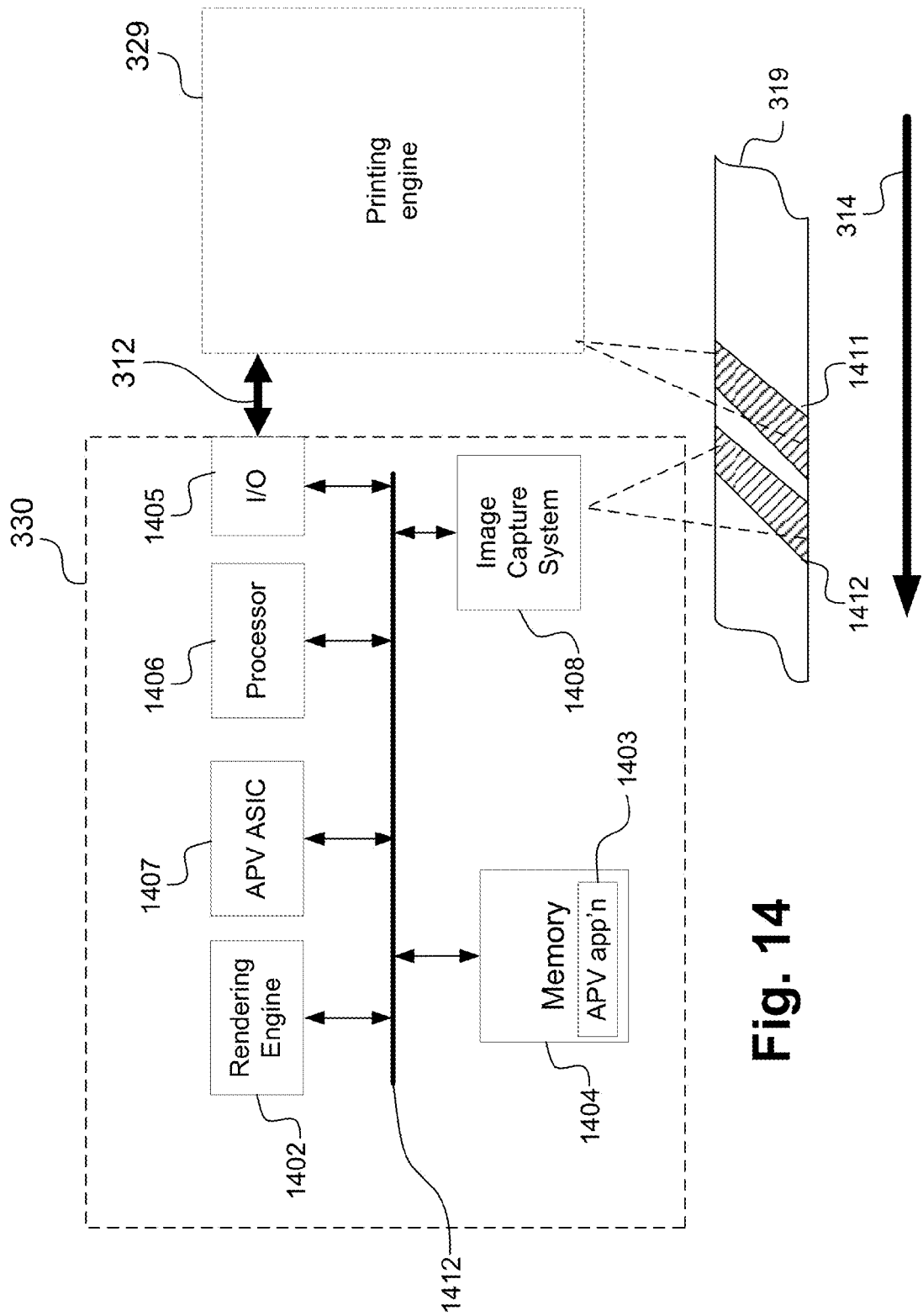
FIG. 14 shows the print verification unit of FIG. 3 in more detail.
Figure 15:
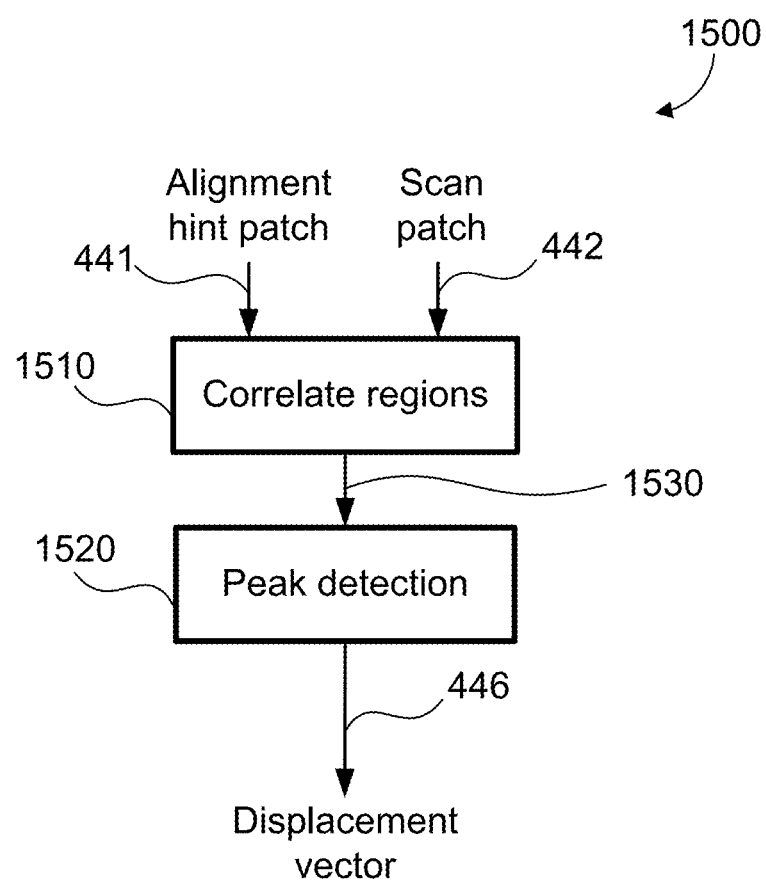
FIG. 15 is a flow-chart showing a method of estimating shift as executed in the method of FIG. 4.

The APV software application programs 1333 may be functionally distributed among the functional elements in the print system 300, as shown in the example in FIG. 14 where at least some code modules of the APV software application program 1333 are stored within a memory 1404 of the print verification unit 330.

The print system 300 of FIG. 13A implements the described APV methods. In particular, with reference to FIG. 13B, the steps of the described APV methods are effected by instructions in the software application program 1333 that are carried out within the controller 1302 possibly in conjunction with processor 1406. The software instructions may be formed as one or more code modules, each for performing one or more particular tasks. The software may also be divided into two separate parts, in which a first part and the corresponding code modules performs the described APV methods and a second part and the corresponding code modules manage a user interface between the first part and the user.

The software 1333 of the embedded controller 1302 is typically stored in the non-volatile ROM 1360 of the internal storage module 323. The software 1333 stored in the ROM 1360 can be updated when required from a computer readable medium. The software 1333 can be loaded into and executed by the processor 301, possibly in conjunction with the processor 1406. In some instances, the processor 301 may execute software instructions that are located in RAM 1370.

Software instructions may be loaded into the RAM 1370 by the processor 301 initiating a copy of one or more code modules from ROM 1360 into RAM 1370. Alternatively, the software instructions of one or more code modules may be pre-installed in a non-volatile region of RAM 1370 by a manufacturer. After one or more code modules have been located in RAM 1370, the processor 301 may execute software instructions of the one or more code modules.

The APV application program 1333 is typically pre-installed and stored in the ROM 1360 by a manufacturer, prior to distribution of the print system 300. However, in some instances, the application programs 1333 may be supplied to the user encoded on one or more CD-ROM (not shown) and read via the portable memory interface 1306 of FIG. 13A prior to storage in the internal storage module 323 or in the portable memory 1325. In another alternative, the software application program 1333 may be read by the processor 301 from the network 1320, or loaded into the controller 1302 or the portable storage medium 1325 from other computer readable media. Computer readable storage media refers to any storage medium that participates in providing instructions and/or data to the controller 1302 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCM-CIA card and the like, whether or not such devices are internal or external of the print system 300. Examples of computer readable transmission media that may also participate in the provision of software, application programs, instructions and/or data to the print system 300 include radio or infrared transmission channels as well as a network connection to another computer or networked device, and the Internet or Intranets including e-mail transmissions and information recorded on Websites and the like. A computer readable medium having such software or computer program recorded on it is a computer program product.

The second part of the APV application programs 1333 and the corresponding code modules mentioned above may be executed to implement one or more graphical user interfaces (GUIs) to be rendered or otherwise represented upon the display 1314 of FIG. 13A. Through manipulation of the user input device 1313 (e.g., the keypad), a user of the print system 300 and the application programs 1333 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 13B illustrates in detail the embedded controller 1302 having the processor 301 for executing the APV application program 1333, possibly in conjunction with the processor 1406, and the internal storage 323 and/or memory 1404. The internal storage 323 comprises read only memory (ROM) 1360 and random access memory (RAM) 1370. The processor 301 is able to execute the APV application programs 1333 stored in one or both of the connected memories 1360, 1370 and 1404. When the controller 1302 is initially powered up, a system program resident in the ROM 1360 is executed. The code modules of application program 1333 permanently stored in the ROM 1360 are sometimes referred to as "firmware". Execution of the firmware by the processor 301 may fulfil various functions, including processor management, memory management, device management, storage management and user interface.

The processor 301 typically includes a number of functional modules including a control unit (CU) 1351, an arithmetic logic unit (ALU) 1352 and a local or internal memory comprising a set of registers 1354 which typically contain atomic data elements 1356, 1357, along with internal buffer or cache memory 1355. One or more internal buses 1359 interconnect these functional modules. The processor 301 typically also has one or more interfaces 1358 for communicating with external devices via system bus 1381, using a connection 1361.

The APV application program 1333 includes a sequence of instructions 1362 through 1363 that may include conditional branch and loop instructions. The program 1333 may also include data, which is used in execution of the program 1333. This data may be stored as part of the instruction or in a separate location 1364 within the ROM 1360 or RAM 1370.

In general, the processor 301 is given a set of instructions, which are executed therein. This set of instructions may be organised into blocks, which perform specific tasks or handle specific events that occur in the print system 300. Typically, the APV application program 1333 waits for events and subsequently executes the block of code associated with that event. Events may be triggered in response to input from a user, via the user input devices 1313 of FIG. 13A, as detected by the processor 301. Events may also be triggered in response to other sensors and interfaces in the print system 300.

The execution of a set of the instructions may require numeric variables to be read and modified. Such numeric variables are stored in the RAM 1370. The disclosed methods use input variables 1371 that are stored in known locations 1372, 1373 in the RAM 1370. The input variables 1371 are processed to produce output variables 1377 that are stored in known locations 1378, 1379 in the RAM 1370 and/or the memory 1404. Intermediate variables 1374 may be stored in additional memory locations in locations 1375, 1376 of the RAM 1370. Alternatively, some intermediate variables may only exist in the registers 1354 of the processor 301.

The execution of a sequence of instructions is achieved in the processor 301, possibly in conjunction with the processor 1406, by repeated application of a fetch-execute cycle. The control unit 1351 of the processor 301 maintains a register called the program counter, which contains the address in ROM 1360 or RAM 1370 of the next instruction to be executed. At the start of the fetch execute cycle, the contents of the memory address indexed by the program counter is loaded into the control unit 1351. The instruction thus loaded controls the subsequent operation of the processor 301, causing for example, data to be loaded from ROM memory 1360 into processor registers 1354, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the APV methods described below is associated with one or more segments of the application program 1333, and is performed by repeated execution of a fetch-execute cycle in the processor 301 or similar programmatic operation of other independent processor blocks in the print system 300.

Components of the print verification unit 330, such as the processor 1406, memory 1404 and print verification I/O unit 1405, are functionally connected via a bus 1412, and are connected to the other processing units of the print system 300 via the data bus 312. The components work in a similar manner to corresponding components 301, 323 and 320 shown in FIG. 3. Accordingly, the components 1406, 1404 and 1405, will not be described in detail below. Furthermore, the processor 1406, memory 1404 and print verification I/O unit 1405 may be the same components as the central processing unit 301, memory 323 and I/O unit 320 or they may be separate components within the print verification unit 330.

Returning to FIG. 1, the top-level flow chart shows method 100 useful for determining if a page contains unexpected differences. In particular, FIG. 1 provides a high-level overview of method 100 of performing colour imaging according to one arrangement executing on the print system 300 including the print verification unit 330 of FIG. 14.

FIG. 14 shows the details of the print verification unit 330 of FIG. 3. In one arrangement, the print verification module 330 may form part of the special function module 1310 of FIG. 13A. The unit 330, which performs the noted verification process, comprises an image inspection device in the form of an image capture system 1408. The image capture system 1408 may be used to assess the quality of output prints by detecting unexpected print differences generated by the print engine 329 which performs printing step 130 in the arrangement of FIG. 1. The source input document 166 to the print system 300 is, in the present example, a digital document expressed in the form of a page description language (PDL) script, which describes the appearance of document pages. Document pages typically contain text, graphical elements (line-art, graphs, etc.) and digital images (such as photographs). The source input document 166 may also be referred to as a source image, source image data and so on.

In a rendering step 120, the source document 166 is rendered using a software rasteriser module (not shown), under control of the processor 301 executing one or more code modules of the APV software application 1333. The source document 166 is rendered by processing the PDL script, to generate a two-dimensional bitmap image 160 of the source document 166. In another implementation, the rasteriser may be implemented in hardware (eg. 1402) or a combination of hardware and software. The rasteriser may also generate alignment information in patch selection step 125. Such alignment information may also be referred to as "alignment hints". The alignment information may take the form of a list 162 of regions of the bitmap image 160 with intrinsic alignment structure. The regions will be referred to as "alignment patches" below. Each alignment hint corresponds to an alignment patch (or region), which is preferably a square patch, with a patch centre (x,y), a patch strength value indicating the amount of intrinsic alignment structure within the patch (e.g., high frequency components, edges, corners, etc.), and a patch size corresponding to the width and height of the alignment patch. The list 162 of alignment hints is sorted in the y-direction, as this is typically the transport direction 314. The rendered bitmap image 160 and the associated list of alignment hints 162 may be temporarily stored in the printer memory 323. A method 800 of selecting a plurality of patches within an alignment patch (or region), as executed at step 125 of FIG. 1, will be described in detail below with reference to FIG. 8. As described below, the method 800 may be used in image alignment.

Upon completing processing in the rendering step 120 and patch selection step 125, the rendered bitmap image 160 is sent to colour print step 130. The colour print step 130 uses the print engine 329, and produces output print 163 by forming a visible image on a print medium such as the paper sheet 319 using the print engine 329. The rendered bitmap image 160 in the memory 323 is transferred in synchronism with (a) a sync signal and clock signal (not shown) required for operating the print engine 329, and (b) a transfer request (not shown) of a specific colour component signal or the like, via the bus 312. The rendered bitmap image 160 together with the generated alignment data 162 is also sent (a) to memory 1404 of the print verification unit 330 via the bus 312 and (b) print verification unit I/O unit 1405, as seen in FIG. 14, for use in a subsequent defect detection step 150.

The output print 163, which is on the paper sheet 319 in the described example, generated by the colour print step 130 is scanned at an image capturing step 140. The output print 163 may be scanned using, for example, the image capture system 1408. In particular, at step 140, the processor 301 may forward a signal (e.g., via processor 1406) to the image capture system 1408 in order to scan the print 163. The image capture system 1408 may be a colour line scanner for real-time imaging and processing. However, any image capturing device that is capable of digitising and producing high quality digital copy of printouts may be used. Such may include, in some arrangements, an imaging device such as a digital camera.

In one arrangement shown in FIG. 14, the image capture system 1408 may be configured to capture an image of the output print 163 from the sheet 319 on a scan-line by scan-line basis, or on a band-by-band basis, where each band comprises a number of scan lines. The captured digital image 164 is sent to print defect detection step 150. A method 200 of detecting defects in the output print 163, as executed at step 150, will be described in more detail below with reference to FIG. 2. The method 200 may be implemented by APV Application Specific Integrated Circuit (ASIC) 1407 and/or APV software application program 1403, upon receipt of a signal from processor 1406. The method 200 aligns and compares the bitmap image 160 and the scan image 164 using alignment data 162 from patch selection step 125 in order to locate and identify print defects in the output print 163. Upon completion, the print defect detection step 150 outputs a defect map 165 indicating defect types and locations of all detected defects within the output print 163. The defect map 165 may be used to make a decision on quality of the output print 163 in a decision step 170. A decision signal 175 is generated by the processor 1406. The decision signal 175 may then be used to trigger an automatic reprint or alert the user to potential issues with the output print 163. In one arrangement, the decision signal 175 is set to "1" (error present) if there are more than ten (10) pixels marked as defective in the defect map 165, or is set to "0" (no error) otherwise. Alternatively, the defective pixel number may be set by the user.

Figure 7:
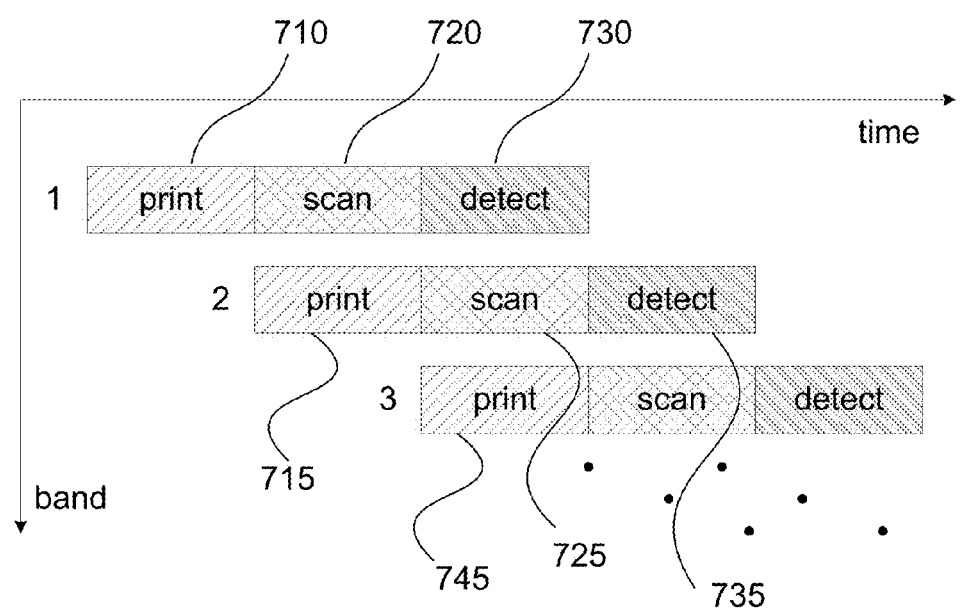
FIG. 7 shows a graphical view of how the steps of the method of FIG. 2 *may* be performed in parallel.
Figure 8:
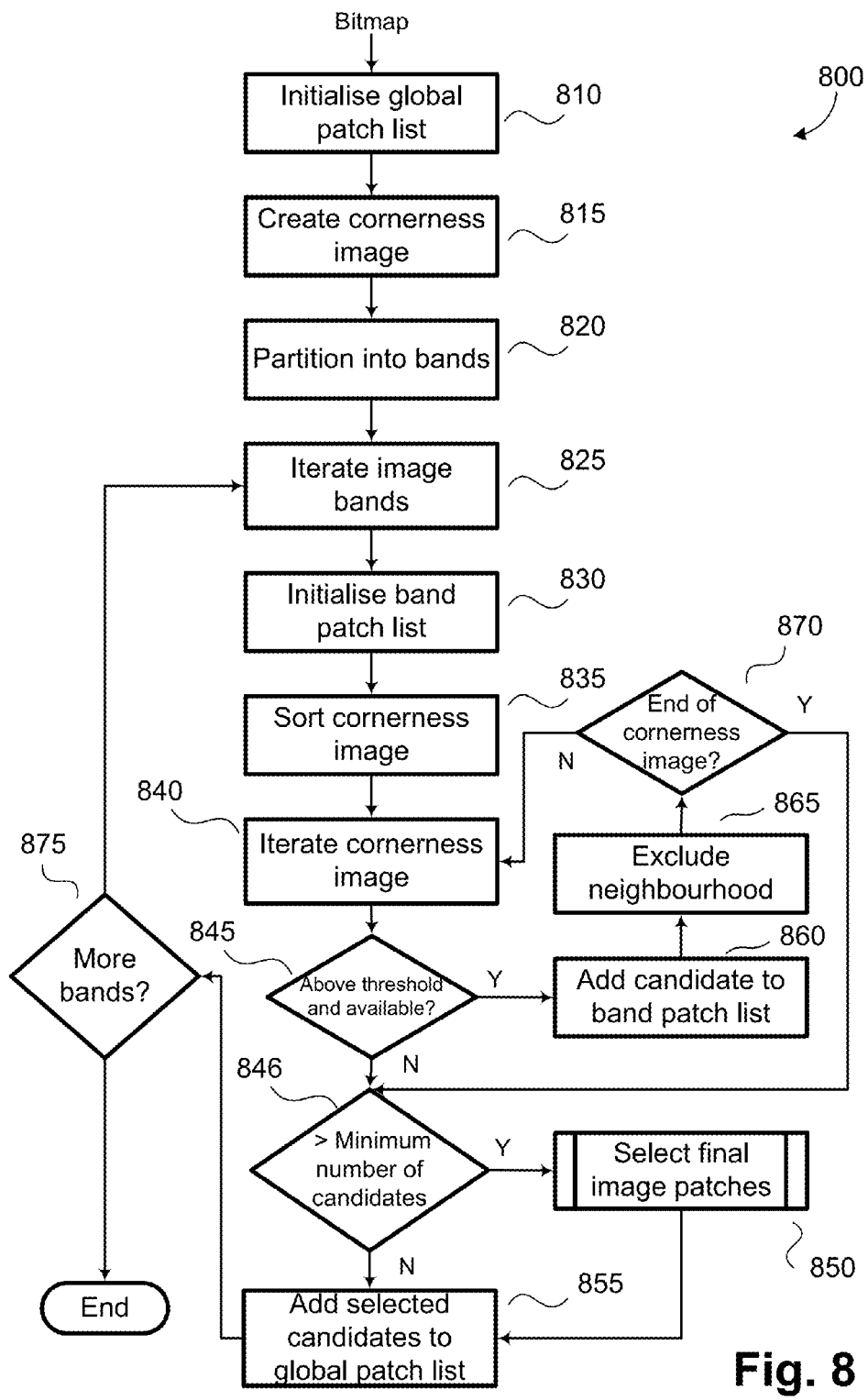
FIG. 8 is a flow-chart showing a method of selecting a plurality of patches within a region, as executed in the method of FIG. 1.

FIG. 7 and FIG. 14 show how, in one arrangement, the print step 130, the scanning step 140 and the defect detection step 150 may be arranged in a pipeline. In such an arrangement, a region 1411, such as a band of the rendered bitmap image 160, is printed by the print system engine 329 to form a corresponding region of the output print 163 on the paper sheet 319. When the printed region 1411 of the output print 163 moves to a position 1412 under the image capture system 1408, the printed region 1411 is scanned according to the scanning step 140 using image capture system 1408 to form part of the scanned image 164. The scan of printed region 1412, as a band of scan-lines, is sent to the print defect detection step 150 for alignment and comparison with corresponding rendered region (band 1411) of the bitmap image 160 that was sent to the print engine 329.

Figure 2:
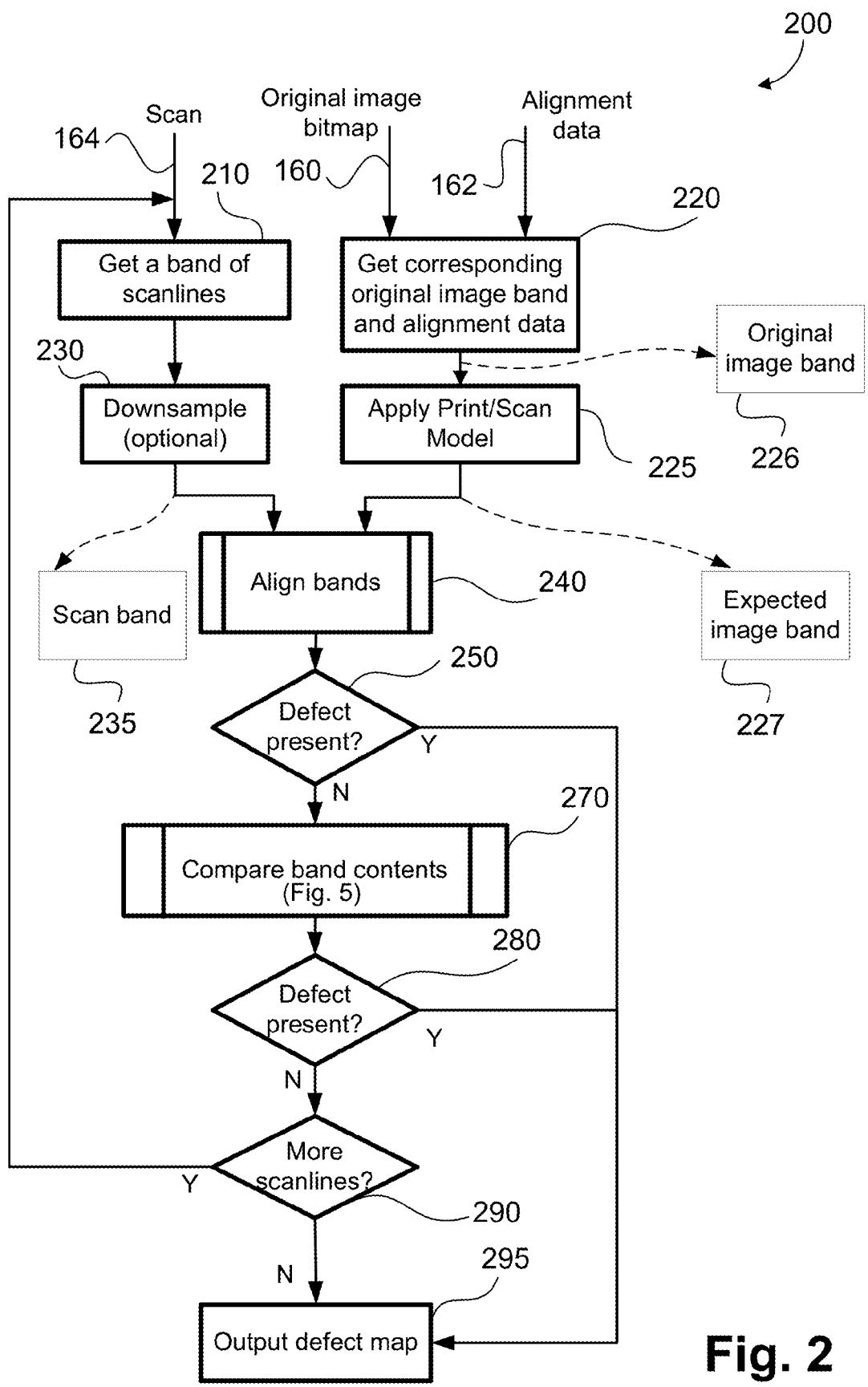
FIG. 2 is a flow-chart showing a method of detecting defects, as executed in the method of FIG. 1.

FIG. 7 shows a graphical view of how the steps of FIG. 2 (to be described) may be performed in parallel. In particular, FIG. 7 shows that as page 319 moves in feed direction 314, a first region of the rendered bitmap image 160 is printed 710 by the print system engine 329 to form a first region of the output print 163. As second region is being printed 715 on the printed page 163, the first region is scanned 720 by the scanning step 140 using the scanner 1408 to form a first region of the scanned image 164. As a third region is being printed 745, the first scanned region is sent 730 to the print defect detection step 150 for alignment and comparison with the corresponding first rendered region that was sent to the print system engine 329, and the second printed region is scanned 725. Subsequent regions of the rendered bitmap image 160 may then be processed in the same manner as shown in FIG. 7. Thus, the pipeline arrangement allows all three processing stages (print, scan, detect) to occur concurrently after the first two regions.

Returning to FIG. 1, it is advantageous, during rasterisation in the step 120, to perform patch selection step 125 on the rendered bitmap image 160 in order to identify alignment regions for the list 162 which provides valuable alignment hints to the print defect detection step 150 as shown in FIG. 1. Accurate registration of the bitmap image 160 and the printout scan image 164 enables image quality metric evaluation to be performed on a pixel-to-pixel basis. One of the significant advantages of such a method is that precise image alignment may be performed without the need to embed special registration marks or patterns explicitly in the source input document 166 and/or the bitmap image 160.

Figures 10A, 10B:
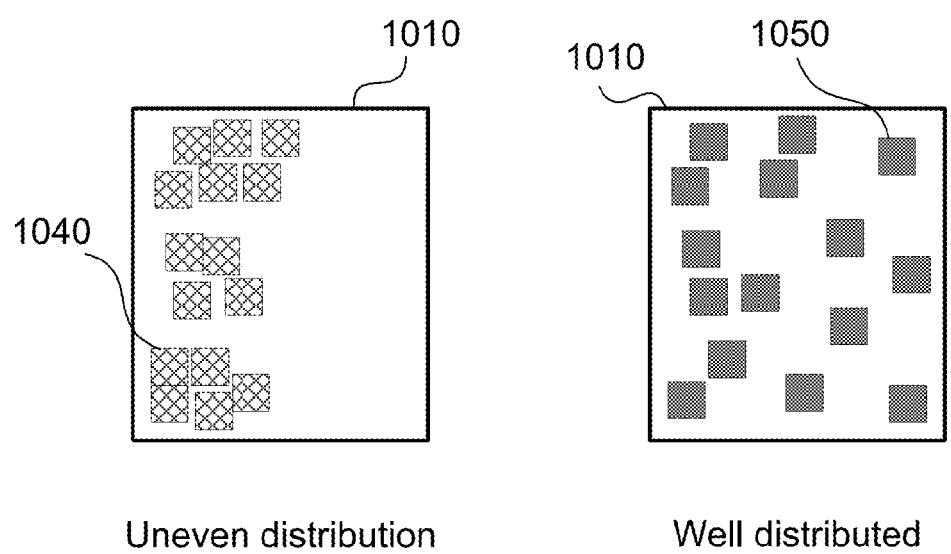
FIG. 10A shows an image comprising image patches selected based on image feature strength.
FIG. 10B shows another image comprising image patches selected based on both strength and mutual proximity.

For patch-based sparse image alignment, the patch selection step 125 may be based on identifying strong image corners or other useful image features and selecting image patches centred on the corners. Each such selected patch is selected based on a feature strength value associated with the selected patch. However, such an approach tends to suffer from uneven distribution, which may lead to inaccurate alignment and stability problems. This is particularly true for documents with sparse contents, where strong image features tend to concentrate in a small number of neighbourhoods, resulting in an intense clustering of patches in those neighbourhoods. For example, FIG. 10A shows a document image 1010 comprising image patches (e.g., 1040). For the image 1010, as shown in FIG. 10A, the image patches 1040 are selected for alignment based on image corner strength alone, resulting in several clusters of patches. In contrast, FIG. 10B shows the image 1010 comprising image patches 1050 where the image patches 1050 have been selected for alignment based on both strength and mutual proximity. In the example of FIG. 10B, distances between the patches 1050 with strong image features are maximised, resulting in an even distribution of the patches 1050.

Using more patches for the image 1010 may improve patch distribution, thereby improving alignment accuracy and robustness, but at a cost to processing speed and efficiency. The print system 300 is a real-time system where image alignment processing speed affects overall performance of the system 300. Choice of patch number and distribution may significantly affect overall performance of the print system 300 in terms of processing speed, print defect detection accuracy and reliability.

The method 100 of FIG. 1 provides a novel patch selection algorithm including patch selection step 125. Step 125 provides a sparse set of well distributed image patches for alignment. The method 800 of selecting a plurality of patches within a region, as executed at patch selection step 125, will now be described in more detail with reference to FIG. 8. The method 800 may be implemented as one or more software code modules of the software application program 1333 resident in the ROM 1360 and being controlled in its execution by the processor 301.

The process 800 begins at initialising step 810, where the processor 301 accesses the bitmap image 160 stored in the memory 323. A global patch list for storing selected patches is also initialised by the processor 301 in step 810. The global patch list may be configured within the RAM 1370 of the memory 323.

In image creating step 815, a cornerness image is created by the processor 301 based on Harris corners detected within the bitmap image 160. The cornerness image may be stored within the RAM 1370. The detection of the Harris corners within the cornerness image will now be described by way of the following example. Given source input document 166 in the form of an A4 size document rendered at 300 dpi, at step 120, the processor 301 generates the bitmap image 160 with an approximate size of 2500 by 3500 pixels. Harris corners are detected within the bitmap image 160 by determining gradient or spatial derivatives of a grey-scale version of the bitmap image 160 in both x and y directions, denoted as $I_x$ and $I_y$. The gradient or spatial derivatives may be approximated by converting the rendered bitmap image 160 to grey-scale and applying the Sobel operator to the grey-scale result. The bitmap image 160 may be converted to grey-scale, if the bitmap image 160 is an RGB image, in accordance with Equation [1], as follows:

$$I_G = R_{y11}I_r + R_{y12}I_g + R_{y13}I_b \qquad [1]$$

where $I_G$ is the grey-scale output image, $I_r$, $I_g$, and $I_b$ are the Red, Green, and Blue image components, and the reflectivity constants are defined as $R_{y11}=0.2990$, $R_{y12}=0.5870$, and $R_{y13}=0.1140$.

If the bitmap image 160 is an 8-bit (0 to 255) encoded CMYK image, the bitmap image 160 may be similarly converted to grey-scale in accordance with Equation [2], as follows:

$$I_G = R_{y11}\mathrm{MAX}(255 - I_c - I_k, 0) + \\ R_{y12}\mathrm{MAX}(255 - I_m - I_k, 0) + R_{y13}\mathrm{MAX}(255 - I_y - I_k, 0) \qquad [2]$$

Other conversions may be used for converting the bitmap image 160 to grey-scale if a higher accuracy is required, although it is generally sufficient in step 815 to use a fast approximation.

The Sobel operators use the kernels of Equations [3], as follows:

$$S_x = \begin{bmatrix} -1 & 0 & 1 \\ -2 & 0 & 2 \\ -1 & 0 & 1 \end{bmatrix} \qquad [3]$$

$$S_y = \begin{bmatrix} -1 & -2 & -1 \\ 0 & 0 & 0 \\ 1 & 2 & 1 \end{bmatrix}$$

Edge detection is performed with the operations of Equations [4], as follows:

$$I_x = S_x * I_G$$

$$I_y = S_y * I_G \qquad [4]$$

where * is the convolution operator, $I_G$ is the grey-scale image data, $S_x$, $S_y$ are the kernels defined above, and $I_x$ and $I_y$ are images containing the strength of the edge in the x and y direction respectively. From $I_x$ and $I_y$, three images are produced at step 815 as represent by Equations [5], as follows:

$$I_{xx} = I_x \circ I_x$$

$$I_{xy} = I_x \circ I_y$$

$$I_{yy} = I_y \circ I_y \qquad [5]$$

where $\circ$ is a pixel-wise multiplication.

The three images $I_{xx}$, $I_{xy}$, and $I_{yy}$, allow a local structure matrix A to be determined over a neighbourhood around each pixel, using the relationship of Equation [6], as follows:

$$A = \sum_{x,y} w(x,y) \begin{bmatrix} I_x^2 & I_x I_y \\ I_x I_y & I_y^2 \end{bmatrix}, \qquad [6]$$

where $w(x, y)$ is a windowing function for spatial averaging over the neighbourhood. In one arrangement, $w(x, y)$ may be implemented as a Gaussian filter with a standard deviation of ten (10) pixels. The cornerness image may be created at step 815 by determining the minimum eigenvalue of the local structure matrix A at each pixel location. The cornerness image created at step 815 is a two dimensional (2D) map of the likelihood that each pixel is a corner. At each pixel location, the cornerness image ($I_c$) is represented by three numbers, namely x-coordinate of the pixel (x), y-coordinate of the pixel (y), and strength of a potential corner as expressed by the minimum eigenvalue of the local structure matrix A at that pixel location or simply the cornerness strength ($\lambda$).

In partitioning step 820, the cornerness image created in step 815 is partitioned by the processor 301 into a number of cornerness image bands or regions which may be stored within the RAM 1370. In one arrangement, the width of each band is the same as the width of the bitmap image 160 and the height of each band is two hundred and fifty six (256) pixels. Alternatively, the cornerness image may be partitioned into cornerness image bands of other sizes.

In following steps, the cornerness image bands are iterated over one at a time. In particular, at selection step 825, the processor 301 selects one of the cornerness image bands ("current cornerness image band") created at step 820.

A band patch list is initialised in list initialisation step 830 for storing candidate patches within the current cornerness image band. The band patch list may be configured within the RAM 1370. A candidate patch is an image patch that has sufficient image structure for alignment. However, the number of candidate patches within a given image band may exceed some predetermined maximum number of alignment patches per band. In this instance, a subset of the candidate patches may be selected as final alignment patches.

Then at sorting step 835, the current cornerness image band is sorted in descending order by the processor 301 according to cornerness strength value ($\lambda$) of the current cornerness image band, while maintaining an association between the cornerness strength $\lambda$ and spatial location (x,y) of the current cornerness image band.

Then at selecting step 840, the processor 301 selects a location ("current location") in the current cornerness image band. At threshold step 845, if the processor 301 determines that cornerness strength value at the current location is greater than or equal to a predetermined threshold and that original spatial location (x, y) of the current location is available for selection, then the method 800 proceeds to step 860. Otherwise, the method 800 proceeds to step 860.

At adding step 860, the cornerness strength value and associated spatial location, represented by original x and y coordinates, are added to the band patch list configured within RAM 1370. The spatial location (x, y) and cornerness strength value added to the band patch list represent a "candidate patch".

Then in excluding step 865, once a spatial location (x, y) in the current cornerness image band has been added to the band patch list configured within RAM 1370, a neighbourhood ("neighbourhood exclusion zone") surrounding the spatial location (x, y) is excluded from further selections. The purpose of the neighbourhood exclusion zone is to set a minimum distance between adjacent image patches. The neighbourhood exclusion zone may be implemented using an exclusion radius $r_e$, where a circular region is formed centring at the spatial location (x,y) with a radius of $r_e$. Alternatively, other neighbourhood methods may be used. For example, the neighbourhood exclusion zone may be implemented based on a square region centring at the spatial location (x, y) where the square region has a height and width of S. In one arrangement, exclusion radius $r_e$ is set to sixty-four (64) pixels.

At deciding step 870, if the processor 301 determines that the end of the current cornerness image band has been reached, then the method 800 proceeds directly to step 846. Otherwise, the method 800 proceeds to step 840 where the processor 301 selects another location in the current cornerness image band configured within RAM 1370.

At decision step 846, if the number of candidate patches in the band patch list is greater than a minimum number of candidates, then the method 800 proceeds to step 850. Otherwise, the method 800 proceeds to step 855.

In selecting step 850, the processor 301 selects final image patches for alignment from the candidate patches in the band patch list configured within RAM 1370. Accordingly, the method 800 is executed for determining one or more image alignment patches distributed across a region of the page, based on content in the page region. Each alignment patch is associated with a spatial location and a feature strength value. A method 900 of identifying final image patches will be described in detail below with reference to FIG. 9.

In adding step 855, the image patches selected in step 850 are added to the global patch list configured within RAM 1370. Then in decision step 875, if the processor 301 determines that there are more image bands to be processed, then the method 800 returns to step 825. Otherwise, the method 800 terminates.

Following execution of the method 800, the global patch list configured within RAM 1370 is a list of image patches suitable for performing alignment between the bitmap image 160 and the scan image 164. The global patch list comprising the list of image patches forms a list 162 of alignment hints for use in image alignment. Each entry in the list 162 may be described by a data structure comprising four data fields. The four data fields are configured for storing an x-coordinate of a centre of a region (corresponding to the spatial location of the corner), a y-coordinate of the centre of the region, the corner strength of the region, and the size of the region.

In other arrangements, feature points in the bitmap image 160 may be determined using Gradient Structure Tensor or Scale-Invariant Feature Transform (SIFT). Further, step 125 of FIG. 1 may be performed on a down-sampled image for speed purposes, in which case processing parameters need to be adjusted accordingly.

Figure 12A:
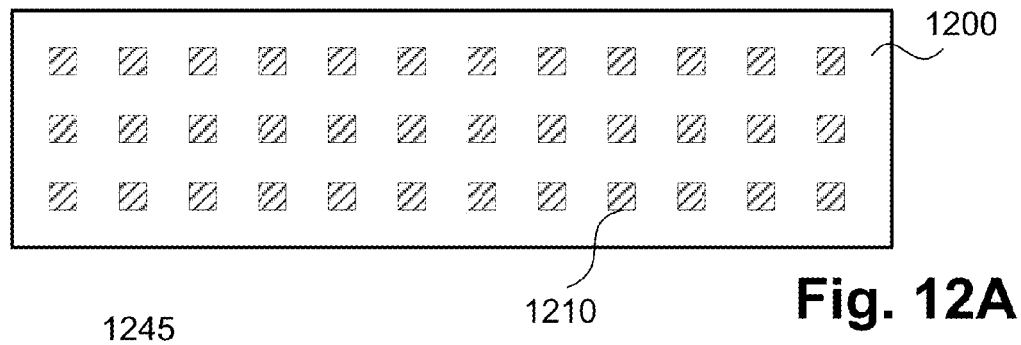
FIG. 12A shows an image band comprising patches regularly distributed across the image band.
Figure 12B:
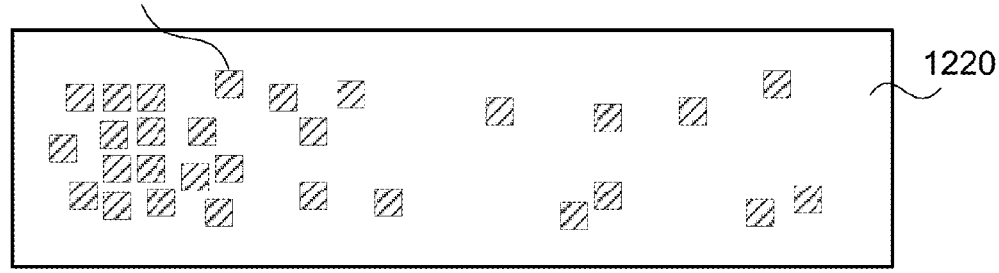
FIG. 12B shows an image band comprising patches distributed irregularly across the image band.

Step 850 is executed in order to improve patch distribution and avoid patch clustering as described above with reference to FIG. 10. Patches may be placed evenly across an image band in order to maximise alignment accuracy, processing efficiency and robustness. For example, FIG. 12A shows an image band 1200 comprising patches (e.g., 1210) evenly distributed across the image band 1200, where each patch 1210 is centred on a Harris corner within the image band 1200. However, due to the variety of layouts and contents that may appear in a printed document image, it is unlikely that a given image will have corners evenly spread out as shown in FIG. 12A. Instead, as seen in FIG. 12B, typically candidate patches (e.g., 1245) and corresponding corners are distributed irregularly across an image band 1220 as shown in FIG. 12B. As described above, it is inefficient to process every corner with strength above a threshold for minimum image structure, since some document images may contain a large number of corners. In such cases, performing alignment using a subset of available corners may produce similar alignment accuracy as using the available corners. The number of image corners for alignment may be limited in order to improve processing speed and efficiency.

Figure 12C:
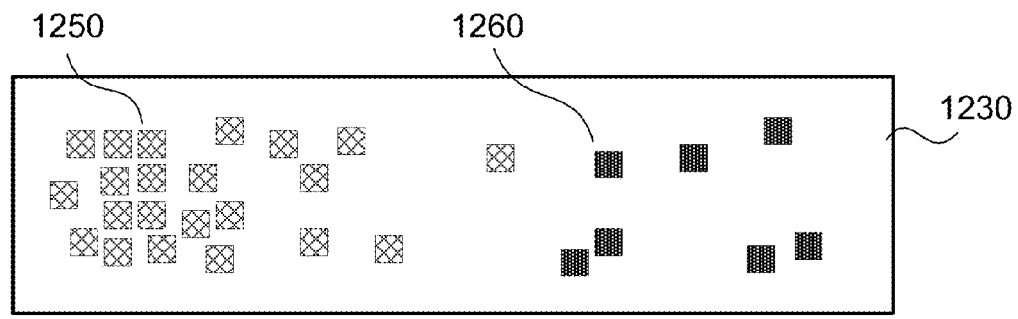
FIG. 12C shows an image band with alignment patches selected based on image feature strength.

For image bands 1220 and 1230, as seen respectively in FIGS. 12B, 12C, assuming each band 1220 and 1230 has more image corners than the desired number to be processed, $N_D$, the required $N_D$ patches may be selected for alignment using the strongest $N_D$ corners as locations for alignment patches. However, the strongest $N_D$ corners may concentrate within one or a small number of neighbourhoods in close proximity. For example, in the image band 1230 seen in FIG. 12C, image patches (e.g., 1250) are associated with the strongest $N_D$ corners, while image patches (e.g., 1260) are associated with the remaining corners. As such, in the image band 1230 of FIG. 12C, there is an unbalanced distribution of patches throughout the image band 1230. Such an unbalanced distribution of patches (e.g., 1250, 1260) is likely to result in low alignment accuracy; and in cases where rotation is strong, alignment failure may occur.

Figure 12D:
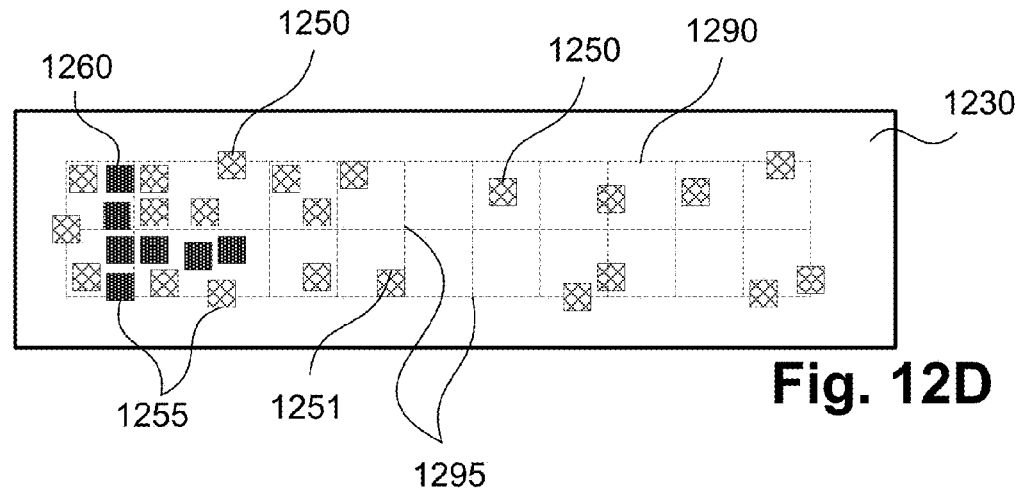
FIG. 12D shows an image band with alignment patches selected using a distribution of grid nodes.

In one arrangement, a step of applying a distribution of grid nodes to a page region (e.g., image band 1230), may be executed. In this instance, an attribute of the distribution of grid nodes (e.g., width, height, and spatial frequency) may be dynamically adjusted according to the distribution of the candidate patches (e.g., 1255) across the image band 1230. The adjusted attribute may include the height of the distribution of grid nodes and the width of the distribution of grid nodes. As shown in FIG. 12D, a virtual grid 1290 may be superimposed on top of available candidate patches (e.g., 1255) of the image band 1230. The virtual grid 1290 may be dynamically adjusted to reflect distribution of the candidate patches 1255, such that the width of the grid 1290 is determined by leftmost and rightmost candidate patches, and the height of the grid 1290 by topmost and bottom-most candidate patches.

The number of nodes (e.g., 1295) of the grid 1290 and/or spacing between the nodes of the grid 1290 may be dependent on a measure of local distortion within the scan image 164. In particular, the spacing between rows and columns of the grid 1290 may be dynamically adjusted to reflect the level of local distortion within the scan image 164. A highly distorted scan image requires a grid 1290 with more rows and columns than a scan image with a lower level of image distortion. As seen in FIG. 12D, the nodes of the grid 1290 are regularly distributed across an image band of the bitmap image 160. Alternatively, the nodes of the grid 1290 may be distributed within an image band of the bitmap image 160 in a different manner compared to other page regions of the page, based on distribution of the candidate patches across the page region.

The virtual grid 1290 may be used for selecting a corresponding candidate patch from the distribution of candidate patches for each of a plurality of the nodes (e.g., 1295) of the grid 1290. Each of the selected candidate patches may be selected based on feature strength value and proximity of the selected patch to a corresponding grid node (e.g., 1295). In particular, each node (e.g., 1295) of the virtual grid 1290 acts as an attractor whose position represents a location for placing an alignment patch within the virtual grid 1290. The immediate neighbourhood of a node (or attractor) (e.g., 1295) forms a region of attraction. Any candidate patch within a region of attraction may be selected as an alignment patch for a corresponding grid node. Each node (or attractor) of the grid 1290 may attract one candidate patch from a corresponding region of attraction. In one arrangement, a grid node (attractor) attracts, from a corresponding region of attraction, the candidate patch with a shortest normalised distance as an alignment patch. The normalised distance between a node (e.g., 1295) of the grid 1290 and any given candidate patch (e.g., 1251) is determined by normalising an Euclidean distance between the node 1295 and a centre of the candidate patch (e.g., 1251) with feature strength of the candidate patch. Alternatively, other distance metrics may be used for alignment patch selection.

In the example in FIG. 12D, the application of the dynamic grid 1290 to patch selection results in a more balanced distribution of alignment patches as shown in FIG. 12D, in which the image patches 1250 are selected for alignment, and the image patches 1260 are discarded. In contrast to the image band 1230 seen in FIG. 12C, there is no clustering of alignment patches (e.g., 1250) in the image band 1230 of FIG. 12D, thus improving alignment accuracy and stability.

Figure 9:
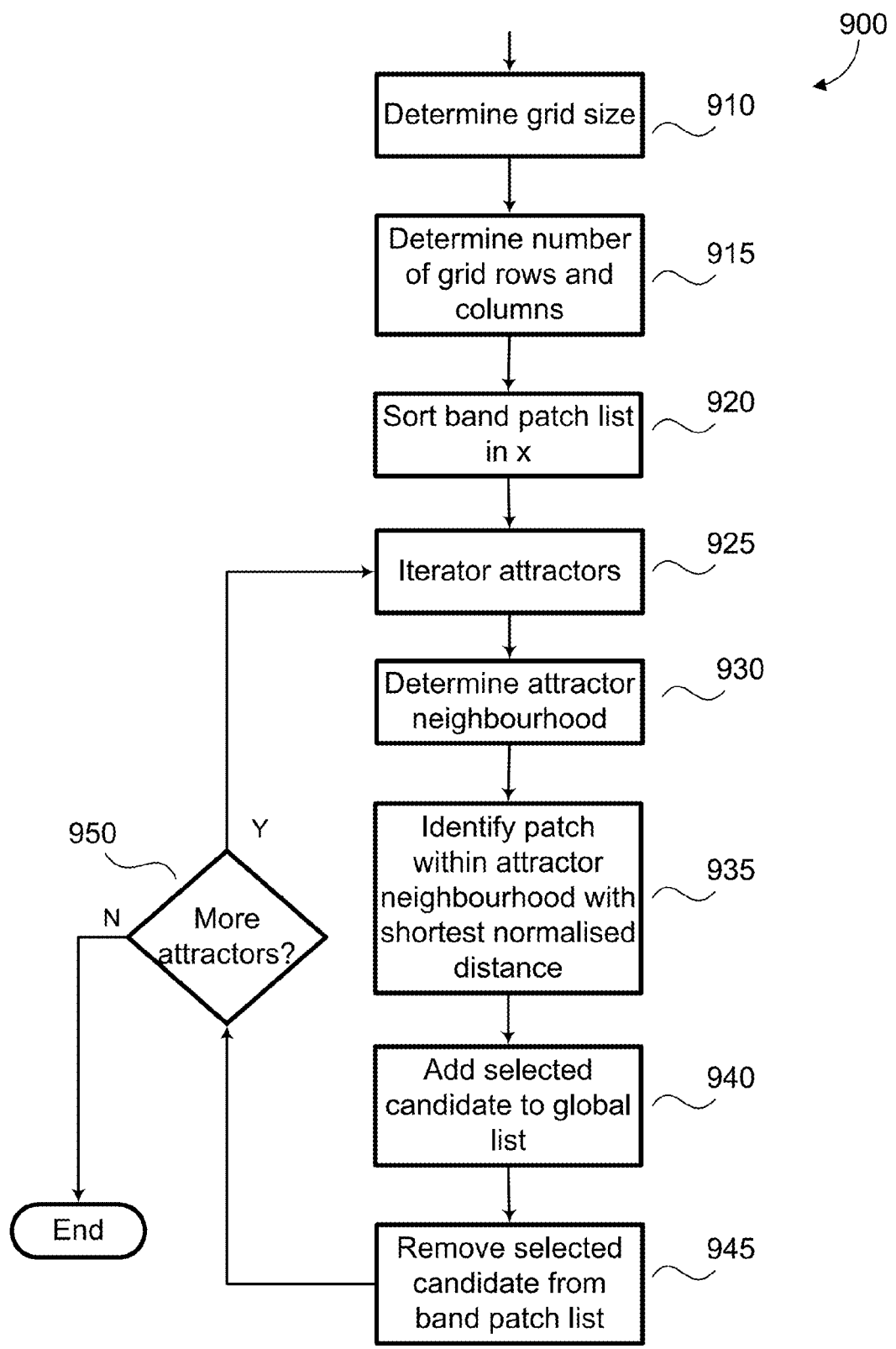
FIG. 9 is a flow-chart showing a method of identifying final image patches, as executed in the method of FIG. 8.

The method 900 of identifying final image patches, as executed in step 850, will now be further described with reference to FIG. 9. The method 900 may be implemented as one or more software code modules of the software application program 1333 resident in the ROM 1360 and being controlled in its execution by the processor 301. The method 900 will be described by way of example with reference to the image band 1230 and the dynamic grid 1290 of FIG. 12D.

In determining step 910, centre locations (x, y) of the candidate patches in the band patch list configured within RAM 1370 are iterated to obtain leftmost, rightmost, topmost and bottommost positions ($x_l$, $x_r$, $y_t$, $y_b$), which define the width ($w_g = [x_r - x_l]$) and height ($h_g = [y_b - y_t]$) of the dynamic grid 1290.

For a given level of distortion in the scan image 164, a predetermined separation between two adjacent alignment patches (e.g., 1250) may be determined. The predetermined separation may be set such that utilising a smaller separation between alignment patches than the predetermined separation, results in little to no improvement in alignment accuracy. Conversely, applying a larger separation than the predetermined separation results in an inaccurate alignment due to insufficient sample points for accurately modelling the distortion present in the scan image 164. The distortion in the horizontal and vertical directions may be modelled separately, giving a horizontal patch separation, $d_h$, and a vertical patch separation, $d_v$, respectively.

In determining step 915, the number of rows in the grid 1290 is determined by the processor 301 in accordance with Equation [7], as follows:

$$N_{rows} = \frac{h_g}{d_v} + 1. \qquad [7]$$

The number of columns in the grid 1290 is also determined in step 915 in accordance with Equation [8], as follows:

$$N_{columns} = \frac{w_g}{d_h} + 1. \qquad [8]$$

Multiplying $N_{rows}$ and $N_{columns}$ gives the maximum number of alignment patches for the image band (e.g., 1230). The $N_{rows}$ and $N_{columns}$ may be stored within the RAM 1370.

In sorting step 920, the band patch list configured within RAM 1370 is sorted by the processor 301 in the x direction, which allows the nodes (or "attractors") (e.g., 1295) of the grid 1290 to be iterated from left to right.

In selecting step 925, the processor 301 selects a node (or "attractor") (e.g., 1295) of the grid 1290. For each node, a corresponding region of attraction is determined in determining step 930. In one arrangement, the region of attraction of a node (e.g., 1295) is the immediate neighbourhood defined by spatial locations of adjacent nodes. Alternatively, the region of attraction of a node (or an attractor) may be defined by a circular region of some predetermined radius or a rectangular region of a predetermined width and height, centring at the node.

In identifying step 935, the candidate patch inside the region of attraction with the shortest normalised distance to the selected node is selected by the processor 301 as a final alignment patch.

The candidate patch selected at step 935 is added to the global patch list configured within RAM 1370 in adding step 940.

In removing step 945, the candidate patch selected at step 935 is removed by the processor 301 from the band patch list configured within RAM 1370 to exclude the candidate patch from further selections. Then in decision step 950, if the processor 301 determines that there are more nodes (or attractors) to be iterated, then the method 900 returns to step 925. Otherwise, the method 900 concludes.

FIG. 2 is a flow-chart showing a method 200 of detecting defects, as executed at step 150 of FIG. 1, in more detail. The method 200 may be implemented by the APV ASIC 1407 and/or one or more code modules of the software application program 1403 resident in the memory 1404.

The method 200 processes bands (or regions) of the bitmap image 160 and the scan image 164. A band of the scan image 164 corresponds to a band 1412 of the page 319 scanned by image capture system 1408. A band of the scan image 164, for example, is a number of consecutive image lines stored in the memory buffer 1404. In one arrangement, a height of each band may be two-hundred and fifty-six (256) scanlines and the width of each band may be the width of the input image 160. For example, for an A4 original document 160 at 300 dpi, the width of each band is two-thousand, four-hundred and ninety (2490) pixels. Image data within the memory buffer 1404 is updated continuously in a "rolling buffer" arrangement where a fixed number of scanlines are acquired by scanning sensors 1408 in scanning step 140. The fixed number of scanlines may be stored in the memory buffer 1404 by flushing an equal number of scanlines out of the memory buffer 1404 in a first-in-first-out (FIFO) manner. In one arrangement, the number of scanlines acquired at each scanner sampling instance is two-hundred and fifty-six (256). In an alternative arrangement, the number of scanlines acquired at each scanner sampling instance is less than the height of the scan band memory buffer, thereby creating an overlapping data content region between any two consecutive scan bands.

As seen in FIG. 2, the method 200 begins at a scanline band retrieval step 210, where the memory buffer 1404 is filled by the processor 1406 with a band of image data ("scan band")

from the scan image 164. The scan band is fed to the processor 1406 after execution of scanning step 140. In the example shown in FIG. 2, the scan band is down-sampled in a down-sampling step 230. For example, the scan band may be down-sampled using a separable Burt-Adelson filter, to reduce the amount of data to be processed, to thereby output a scan band 235 which is a band of the scan image 164. However, step 230 is optional and may be excluded. Alternatively, capturing system 1408 with a low resolution image sensor may be used to acquire a low resolution scan band 235.

As seen in FIG. 2, in parallel to step 210, a band of the bitmap image 160 at the corresponding resolution and location as the scan band 235, is obtained by the processor 1406 in an original image band and alignment data retrieval step 220. The list 162 of alignment hints generated in patch selection step 125 for image alignment is passed to the processor 1406 by the processor 301 for processing at step 220. Once the corresponding original image band 226 has been extracted in step 220, a model of a print and capture process (hereafter referred to as a "print/scan model") is applied by the processor 1406 to original image band 226 at a model application step 225. At step 225, the processor 1406 applies a set of transforms to the original image band 226, in accordance with the print/scan model, to change the original image band 226. The transforms produce an image representing an expected output of a print and scan process, referred to as the "expected image band" 227. The print/scan model may include many smaller component models. Alternatively, the print/scan model application step 225 may be implemented prior to the patch selection step 125. In another arrangement, the method 200 may exclude step 220, such that the whole bitmap 160 is processed by print/scan model application step 225 and the resultant expected image is used for alignment with the scan band 235 in alignment step 240.

In one arrangement, three effects are modelled by the print/scan model. In particular, a dot-gain model, an MTF (Modulation Transfer Function) model, used for example for blur simulation, and a colour model, are modelled by the print/scan model. Each of the smaller models may receive as an input, one or more printer operating conditions, where printer operating conditions are various aspects of machine state which have an impact on output quality of output print 163. Since the printer operating conditions are, in general, time varying, the print/scan model application step 225 is also time varying, reflecting the time varying nature of the operating conditions. In one arrangement, the operating conditions may be configured as parameters derived from print system sensor outputs and environmental sensor outputs. The operating condition parameters may be used to determine a set of parameters for characterising and modelling the print system 300. The print/scan model allows a digital source document to be rendered with an appearance that resembles a printed copy of the digital source document under the operating conditions.

Examples of printer operating conditions include the output of a sensor that detects the type of paper 319 held in input tray 315 and the output of a sensor that monitors age of printing drum(s) in the image forming units 302-305. Another example of a printer operating condition includes number of pages printed using a current drum, also known as a drum's "click count". Still other examples of a printer operating condition include output of a sensor that monitors the level and age of toner/ink in the reservoirs 307-310, output of a sensor that measures internal humidity inside the print engine 329, output of a sensor that measures internal temperature in the print system 300, time since a last page was printed (also known as idle time), time since the machine last performed a self-calibration and pages printed since last service.

The operating conditions may be measured by a number of operating condition detectors for use in the method 100 or to aid service technicians. The operation condition detectors may be implemented using a combination of sensors (e.g., a toner level sensor for toner level notification in each of the toner reservoirs 307-310, a paper type sensor, or a temperature and humidity sensor), a clock (e.g., to measure time since a last print), and internal counters (e.g., number of pages printed since last service). For example, if the toner level sensor indicates a low level of toner, the print/scan model may be adapted so that the rendered digital document has an appearance that resembles a printed page with faint colours.

Returning to FIG. 2, the scan band 235 and the expected image band 227 are then processed by the processor 1406 at a band alignment step 240. In particular, at step 240, the processor 1406 performs image alignment of the scan band 235 and the expected image band 227 using the list of alignment patches (i.e., alignment hints) 162. As step 225 does not change the coordinate system of the original image band 226, spatially aligning the coordinates of the scan band 235 to the expected band 227 is equivalent to aligning the coordinates to the original image band 226.

At step 240, the processor 1406 establishes pixel-to-pixel correspondence between the scan band 235 and the expected image band 227 prior to a comparison process in step 270. In order to perform real-time print defect detection, a fast and accurate image alignment method is desirable. A block based correlation technique, where correlation is performed for every block in a regular grid, is inefficient. Furthermore, such block based correlation does not take into account whether or not a block contains image structure that is intrinsically alignable. Inclusion of unreliable correlation results can affect overall image alignment accuracy. The described methods overcome the above disadvantages of block based correlation by using a patch-based sparse image alignment technique that accurately estimates a geometrical transformation between images using alignable regions. A method 400 of aligning image bands, as executed at step 240, will be described in greater detail below with reference to FIG. 4.

In decision step 250, a test is performed by the processor 1406 as directed by the APV ASIC 1407 and/or the APV software application program 1433 to determine if any geometric errors, indicating a misalignment condition (e.g. excessive shift, skew, etc.) were detected in step 240. Step 250 will be described in further detail below with reference to FIG. 4. If the result of the test at step 250 is Yes, then the method 200 moves to a defect map output step 295. Otherwise, the method 200 continues at a band content comparison step 270.

As a result of processing in step 240, the scan band 235 and the expected image band 227 are accurately aligned with pixel-to-pixel correspondence. The aligned image bands are further processed at comparing step 270, where the processor 1406, as directed by the APV ASIC 1407 and/or the APV software application program 1403, compares contents of the scan band 235 and the expected image band 227 to locate and identify print defects. A method 500 of comparing image bands, as executed at step 270, will be described in greater detail with reference to FIG. 5.

Following step 270, a check is made by the processor 1406 at a decision step 280 to determine if any print defects were detected in step 270. If the result of step 280 is No, then the method 200 continues at decision step 290. Otherwise processing continues at step 295.

At decision step 290 the processor 1406 determines if there are any new scanlines from image capture system 1408 to be processed. If the result of step 290 is Yes, then the method 200 returns to step 210 where the existing band in the memory buffer 1404 is rolled (i.e., the top two-hundred and fifty-six (256) scanlines of the band are removed and remaining scanlines in the memory buffer 1404 are moved up by two-hundred and fifty-six (256) lines, with the final two-hundred and fifty-six (256) lines replaced by newly acquired scanlines from step 140. If the result of step 290 is No, then the method 200 continues at step 295, where defect map 165 is updated. Step 295 concludes the method 200, and control returns to step 170 in FIG. 1.

Returning to FIG. 1, a decision is made in decision step 170 as to acceptability of output print 163. The defect map 165 may for example be displayed on the video display 1314 for checking by an operator to manually make a decision regarding appropriateness of printed page 163.

Sparse image alignment used in the described methods use a small number of selected image patches to determine local shift measurements between a pair of input images. In this instance, local shift measurements are assumed to be consistent with a global motion model that maps one input image to the other. By measuring local shifts, image transformation between the bitmap image 160 and the scan image 164 may be modelled. Furthermore, as described above, a band-based arrangement is used to perform alignment step 240. Rather than aligning the whole bitmap image 160 to the whole scan image 164, alignment step 240 is performed using image bands extracted from the bitmap image 160 and the scan image 164.

Figure 11A:
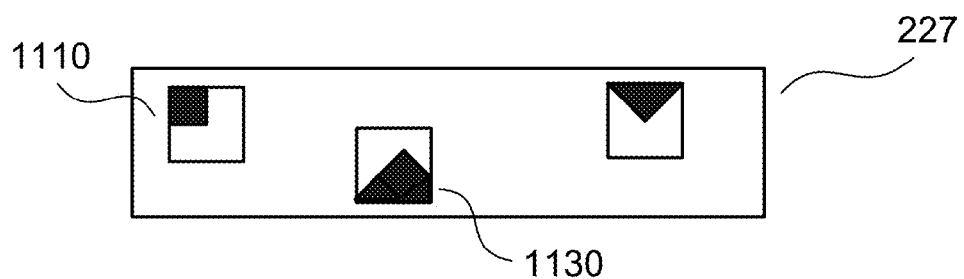
FIG. 11A shows an example of an expected image band.
Figure 11B:
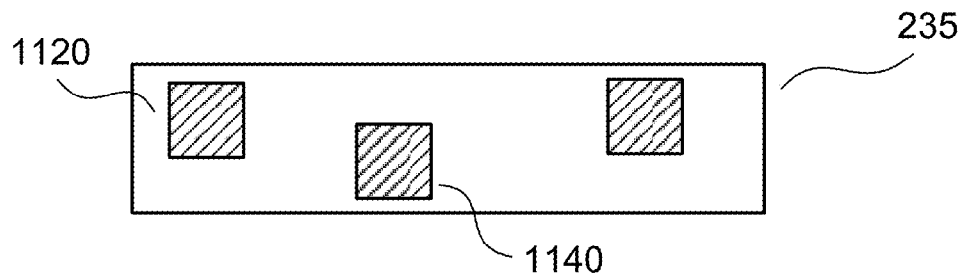
FIG. 11B shows an example of a scan image band.

FIGS. 11A and 11B show the detail of two bands which, according to one example, may be processed in alignment step 240 of FIG. 2. In particular, FIG. 11A shows an example of expected image band 227. Further, FIG. 11B shows an example of scan image band 235. Relative positions of an example alignment patch 1110 in the expected image band 227 and a corresponding image patch 1120 in the scan image band 235 are shown in FIGS. 11A and 11B, respectively. Shift estimation may then be performed, by the processor 1406 as directed by the APV ASIC 1407 and/or the APV arrangement software program 1403, on the two patches 1110 and 1120 to determine a translation that relates the two patches 1110 and 1120. A next pair of patches, referenced as 1130 and 1140 in FIG. 11, may then be selected from expected image band 227 and scan image band 235. The patch 1130 is another alignment patch and the patch 1140 is the corresponding patch as determined by the spatial transformation between the two images 160 and 164. Shift estimation may then be repeated between the new pair of patches 1130 and 1140. All the alignment patches 162 within the expected image band 227 may be processed in a similar manner to the patches (e.g., 1110, 1130) of FIG. 11A.

Figure 4:
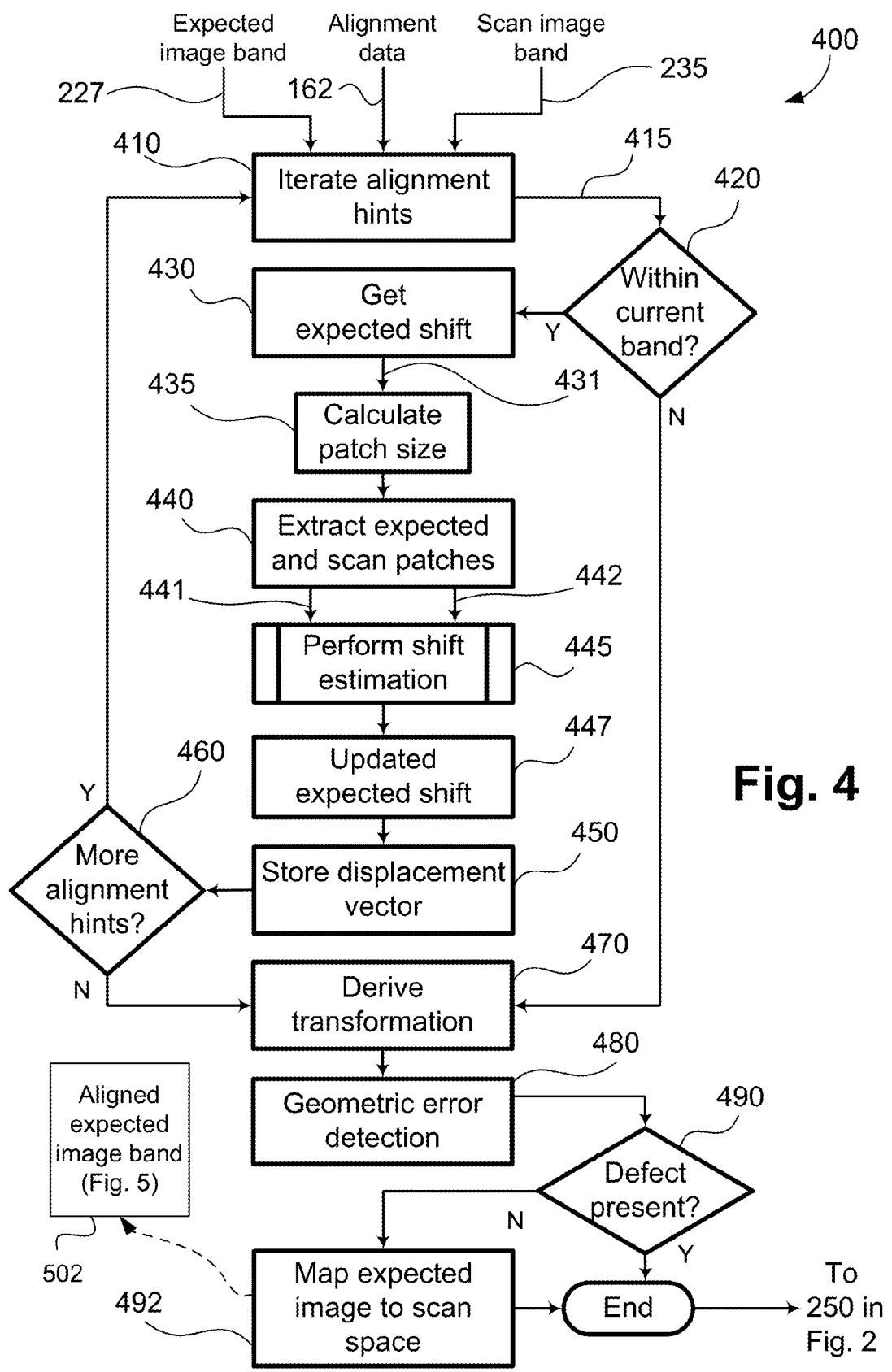
FIG. 4 is a flow-chart showing a method of aligning image bands, as executed in the method of FIG. 2.

The method 400 of aligning image bands, as executed at step 240, will be described in greater detail below with reference to FIG. 4. The method 400 may be executed by the processor 1406 as directed by the APV ASIC 1407 and/or one or more code modules of the software application program 1403 resident in the memory 1404. The method 400 operates on two image bands, being the scan image band 235 and the expected image band 227, and makes use of the alignment hint data 162 derived in the step 125.

The method 400 begins at an initial step 410, where the list 162 of alignment hints is iterated by checking each hint progressively to identify suitable alignment hints for further processing. The list 162 may be stored in the memory buffer 1404 by the processor 1406 in conjunction with the processor 301.

If it is determined in a following decision step 420 that a current alignment hint 415 is within a current band, then the method 400 moves to step 430. Otherwise, the method 400 continues to a transformation deviation step 470.

The current alignment hint 415 identified in step 410 is described by a data structure which may be configured within the memory buffer 1404. The data structure comprises four data fields for storing:
  (i) x coordinate of the hint location in a coordinate space of original image bitmap 160,
  (ii) y coordinate of the hint location in the coordinate space of original image bitmap 160,
  (iii) corner (or feature) strength of the hint, and
  (iv) patch size of the hint.

In obtaining step 430, the processor 1406 obtains an expected shift parameter from memory buffer 1404. The expected shift parameter is an estimate of shift between a current estimated location of the current alignment hint 415 in the scan image band 235 and an actual hint location in the scan image band 235. The current estimated location is determined using a transformation derived from a previous alignment operation on a previous image band. The transformation transforms the x and y coordinates of the current alignment hint 415 in the original image bitmap's coordinate space to a corresponding location (x and y coordinates) in the scan image band 235. The expected shift parameter is used for selecting a suitable patch size, and may also be used for selecting a suitable shift estimation method.

For each of the current alignment hint 415, a patch size $S_p$ may be determined using expected shift value 431 and stored within the memory 1404. In one arrangement, the patch size may be determined using in accordance with Equation 10A, as follows:

$$S_p = \max(\alpha E, S_{pmin}) \quad [10A]$$

where $\alpha$ is a scaling factor, E is expected shift value, and $S_{pmin}$ is minimum patch size. In one implementation $\alpha$ is set to two-point-five (2.5) and $S_{pmin}$ is set to eight (8) pixels.

In extraction step 440, a patch 441 of size $S_p \times S_p$ centred at the current alignment hint location 415 is extracted from expected image band 227 and stored within the memory 1404. At the same time, a patch 442 of size $S_p \times S_p$ centred at corresponding hint location in the scan image band 235 is extracted and stored within the memory 1404. The corresponding hint location is determined using a current estimate transformation derived from a previous alignment operation on a previous document image or band to transform the x and y coordinates of the current alignment hint 415 to a corresponding location (x and y coordinates) in the scan image band 235.

In shift operation step 445, the processor 1406 performs a shift estimation operation between alignment hint patch 441 and corresponding hint patch 442 in the scan image band 235. In one arrangement, "phase only" correlation (hereinafter referred to as "phase correlation") is used to perform the shift estimation operation. Alternatively, other shift estimation methods, such as gradient-based shift estimation, may be used. A method 1500 of estimating shift, as executed at step 445, will now be described with reference to FIG. 15.

The method 1500 may be executed by the processor 1406, as directed by the APV ASIC 1407 and/or one or more code modules of the software application program 1403 resident in the memory 1404.

The method 1500 begins at step 1510, where the processor 1406 applies a window function, such as a Hanning window, to each of the two patches 441 and 442. The two windowed patches are then padded with zeros to twice the patch width and height. The two padded patches are then phase correlated in step 1510. The phase correlation of step 1510 produces a raster array 1530 of real values.

In a following peak detection step 1520, the location of a highest peak is determined within the raster array 1530 and stored within the memory 1404, with the location of the highest peak being relative to the centre of the alignment hint patch. A confidence factor for the peak may also be determined. The confidence factor may be defined as height of the detected peak relative to height of a second peak. The shift estimation step 445 outputs a displacement vector 446 formed of the highest peak location and the confidence factor.

After step 445, the method 400 moves to step 447, where current expected shift value 431 is updated by the processor 1406 and stored within the memory 1404. Due to local distortion or non-translational transformations (e.g. rotation and scaling, etc.) the expected shift may not be uniform across the scan image band 235. That is, the expected shift at one end of the scan image band 235 may not be the same as the expected shift at the other end. In this instance, one expected shift value for each neighbourhood may be determined. In one arrangement, the scan image band 235 may be partitioned into five (5) equal size columns, where each column has an expected shift value. Each expected shift value is determined using information within a neighbourhood. In particular, each expected shift value may be derived using in accordance with Equation [10B], as follows:

$$E_t(i) = (1-\omega) \text{abs}(s_i) + \omega E_{t-1}(i) \quad [10B]$$

where $E_t(i)$ is current expected shift value in ith column of the scan image band 235, $\omega$ is a decay rate for controlling sensitivity of $E_t(i)$ to recent shift measurements, $s_i$ is latest shift measurement within the ith column, and $E_{t-1}(i)$ is a previous expected shift value for the ith column After updating the current expected shift value, the location of the peak, the confidence factor, and the centre of the alignment hint patch may then be stored in memory buffer 1404 in a vector displacement storage step 450. If it is determined by the processor 1406 in a following decision step 460 that more alignment hints exist, then the method 400 returns to step 410, where a next alignment hint 415 is selected. Otherwise the method 400 continues to a transformation derivation step 470.

In an alternative arrangement, binary correlation may be used in place of phase correlation.

The output of the phase correlations is a set of displacement vectors D(n) that represents the transformation that is required to map pixels of the expected image band 227 to the scan image band 235.

In the step 470, the processor 1406 determines a transformation from the displacement vectors. The transformation may be stored in memory 1404. In one arrangement, the transformation is an affine transformation with a set of linear transform parameters ($b_{11}$, $b_{12}$, $b_{21}$, $b_{22}$, $\Delta x$, $\Delta y$), that relates the displacement vectors in the Cartesian coordinate system as follows in Equation [11]:

$$\begin{pmatrix} \tilde{x}_n \\ \tilde{y}_n \end{pmatrix} = \begin{pmatrix} b_{11} & b_{21} \\ b_{12} & b_{22} \end{pmatrix} \begin{pmatrix} x_n \\ y_n \end{pmatrix} + \begin{pmatrix} \Delta x \\ \Delta y \end{pmatrix} \quad [11]$$

where ($x_n$, $y_n$) are alignable region centres and ($\tilde{x}_n$, $\tilde{y}_n$) are affine transformed points.

In addition, points ($x_n$, $y_n$) are displaced by the displacement vectors D(n) to give displaced points ($\hat{x}_n$, $\hat{y}_n$) as follows in Equation [12]:

$$(\hat{x}_n, \hat{y}_n) = (x_n, y_n) + D(n) \quad [12]$$

A suitable affine transformation may be determined by minimising error between displaced coordinates, ($\hat{x}_n$, $\hat{y}_n$), and affine transformed points ($\tilde{x}_n$, $\tilde{y}_n$) by changing affine transform parameters ($b_{11}$, $b_{12}$, $b_{21}$, $b_{22}$, $\Delta x$, $\Delta y$). The error functional to be minimised is the Euclidean norm measure E as follows in Equation [13]:

$$E = \sum_{n=1}^{N} (\hat{x}_n - \tilde{x}_n)^2 + (\hat{y}_n - \tilde{y}_n)^2 \quad [13]$$

The minimising solution is shown in Equations [14], as follows:

$$\begin{pmatrix} b_{11} \\ b_{12} \\ \Delta x \end{pmatrix} = M^{-1} \begin{pmatrix} \sum \hat{x}_n x_n \\ \sum \hat{x}_n y_n \\ \sum \hat{x}_n \end{pmatrix} \quad [14]$$

$$\begin{pmatrix} b_{21} \\ b_{22} \\ \Delta y \end{pmatrix} = M^{-1} \begin{pmatrix} \sum \hat{y}_n x_n \\ \sum \hat{y}_n y_n \\ \sum \hat{y}_n \end{pmatrix}$$

with the following relationships of Equations [15]:

$$M = \begin{pmatrix} S_{xx} & S_{xy} & S_x \\ S_{xy} & S_{yy} & S_y \\ S_x & S_y & S \end{pmatrix} = \begin{pmatrix} \sum x_n x_n & \sum x_n y_n & \sum x_n \\ \sum y_n x_n & \sum y_n y_n & \sum y_n \\ \sum x_n & \sum y_n & \sum 1 \end{pmatrix} \quad [15]$$

$$M^{-1} = \frac{1}{|M|} \begin{pmatrix} -S_y S_y + S S_{yy} & -S S_{xy} + S_x S_y & S_{xy} S_y - S_x S_{yy} \\ -S S_{xy} + S_x S_y & -S_x S_x + S S_{xx} & S_x S_{xy} - S_{xx} S_y \\ S_{xy} S_y - S_x S_{yy} & S_x S_{xy} - S_{xx} S_y & -S_{xy} S_{xy} + S_{xx} S_{yy} \end{pmatrix}$$

and the relationships of Equation [16]:

$$|M| = \det M = -S S_{xy} S_{xy} + 2 S_x S_{xy} S_y - S_{xx} S_y S_y - S_x S_x S_{yy} + S S_{xx} S_{yy} \quad [16]$$

where the sums are carried out over all displacement vectors with a peak confidence greater than a threshold $P_{min}$. In one arrangement, $P_{min}$ is equal to 2.0.

Following step 470, the set of linear transform parameters ($b_{11}$, $b_{12}$, $b_{21}$, $b_{22}$, $\Delta x$, $\Delta y$) is examined by the processor 1406 in a geometric error detection step 480 to identify geometric errors such as rotation, scaling, shearing and translation. The set of linear transform parameters ($b_{11}$, $b_{12}$, $b_{21}$, $b_{22}$, $\Delta x$, $\Delta y$) when considered without the translation is a 2×2 matrix as in Equation [17], as follows:

$$A = \begin{bmatrix} b_{11} & b_{21} \\ b_{12} & b_{22} \end{bmatrix}, \quad [17]$$

The matrix of Equation [17] may be decomposed into individual transformations, assuming a particular order of transformations, as shown in Equation [18], as follows:

$$\begin{bmatrix} b_{11} & b_{21} \\ b_{12} & b_{22} \end{bmatrix} = \begin{bmatrix} s_x & 0 \\ 0 & s_y \end{bmatrix} \cdot \begin{bmatrix} 1 & 0 \\ h_y & 1 \end{bmatrix} \cdot \begin{bmatrix} \cos\theta & -\sin\theta \\ \sin\theta & \cos\theta \end{bmatrix} \quad [18]$$

where scaling is defined in accordance with Equation [19], as follows:

$$\begin{bmatrix} s_x & 0 \\ 0 & s_y \end{bmatrix} \quad [19]$$

where $s_x$ and $s_y$ specify the scale factor along the x-axis and y-axis, respectively.

Shearing is defined in accordance with Equation [20], as follows:

$$\begin{bmatrix} 1 & 0 \\ h_y & 1 \end{bmatrix} \quad [20]$$

or $$\begin{bmatrix} 1 & h_x \\ 0 & 1 \end{bmatrix}$$

where $h_x$ and $h_y$ specify the shear factor along the x-axis and y-axis, respectively.

Rotation is defined in accordance with Equation [21], as follows:

$$\begin{bmatrix} \cos\theta & -\sin\theta \\ \sin\theta & \cos\theta \end{bmatrix} \quad [21]$$

where $\theta$ specifies the angle of rotation.

The parameters $s_x$, $s_y$, $h_y$, and $\theta$ may be determined from the above matrix coefficients by the following Equations [22], [23], [24] and [25]:

$$s_x = \sqrt{b_{11}^2 + b_{21}^2} \quad [22]$$

$$s_y = \frac{\det(A)}{s_x} \quad [23]$$

$$h_y = \frac{b_{11}b_{12} + b_{21}b_{22}}{\det(A)} \quad [24]$$

$$\tan\theta = -\frac{b_{21}}{b_{11}} \quad [25]$$

In one arrangement, the allowable horizontal or vertical displacement magnitude $\Delta_{max}$ is four (4) pixels for images at 300 dpi, and scale factor range ($s_{min}$, $s_{max}$) is (0.98, 1.02). In such an arrangement, allowable shear factor magnitude $h_{max}$ is 0.01, and angle of rotation is 0.1 degrees.

However, suitable alternative parameters, allowing for greater translation or rotation, may also be used.

If the derived transformation obtained in step 470 satisfies the above affine transformation criteria, then the scan band 235 is deemed to be free of geometric errors in a following decision step 490, and the method 400 continues at an expected image to scan space mapping step 492. Otherwise, the method 400 concludes.

In step 492, the set of registration parameters is used to map the expected image band 227 to the scan image space. In particular, RGB value at coordinate $(x_s, y_s)$ in the transformed image band is the same as RGB value at coordinate $(x, y)$ in expected image band 227, where coordinate $(x, y)$ is determined by an inverse of the linear transformation represented by the registration parameters in Equation [26], as follows:

$$\begin{pmatrix} x \\ y \end{pmatrix} = \frac{1}{b_{11}b_{22} - b_{12}b_{21}} \begin{pmatrix} b_{22} & -b_{21} \\ -b_{12} & b_{11} \end{pmatrix} \begin{pmatrix} x_s - \Delta x \\ y_s - \Delta y \end{pmatrix}. \quad [26]$$

For coordinates $(x, y)$ that do not correspond to integer pixel positions, an interpolation scheme (e.g., bi-linear interpolation) may be used to calculate the RGB value at $(x, y)$ from neighbouring values. Following step 492, the method 400 concludes.

In an alternative arrangement, in step 492 the set of registration parameters may be used to map the scan image band 235 to the original image coordinate space. As a result of such mapping in the step 492, the expected image band 227 and the scan image band 235 are aligned.

Figure 5:
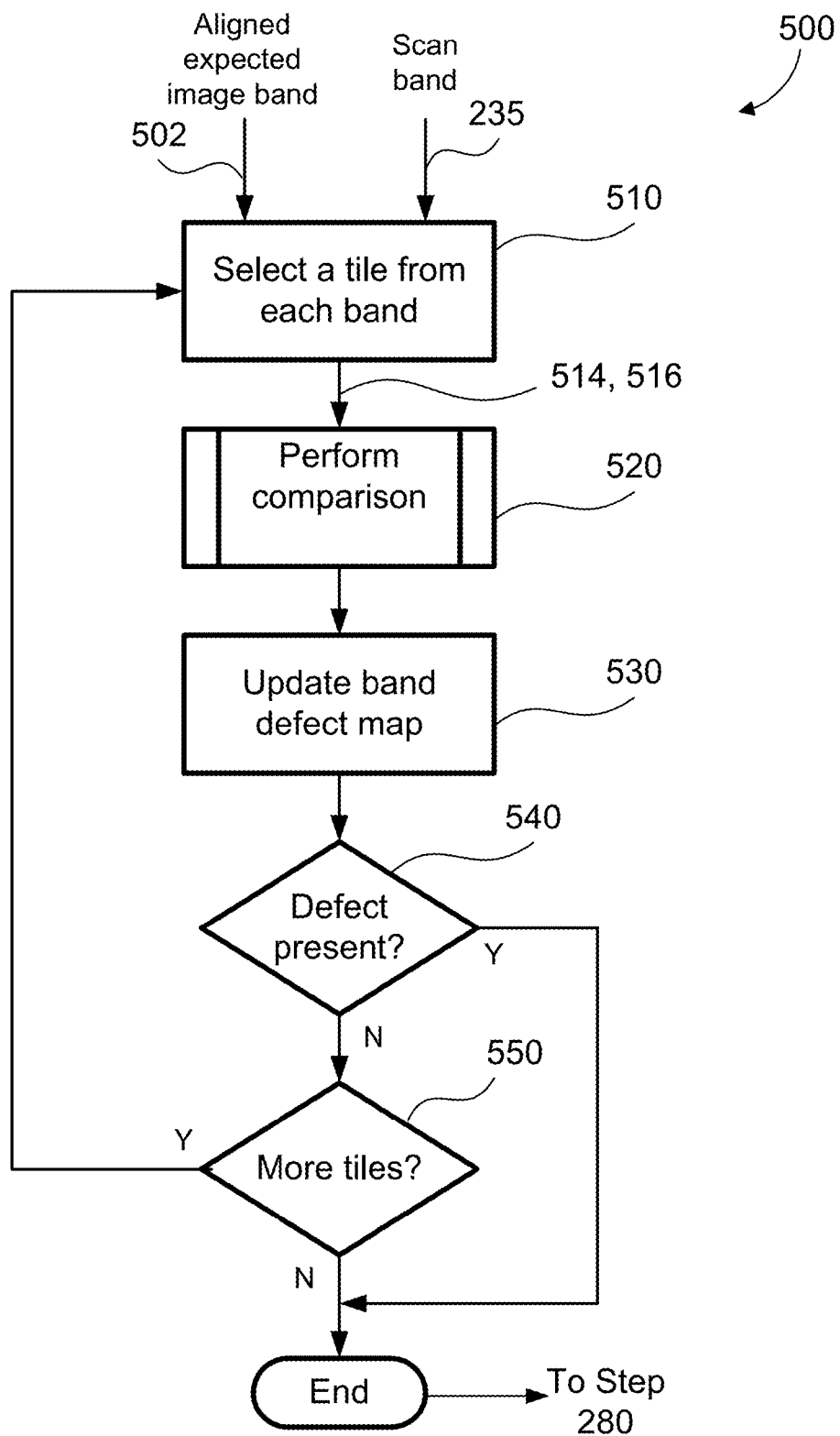
FIG. 5 is a flow-chart showing a method of comparing image bands, as executed in the method of FIG. 2.
Figure 6:
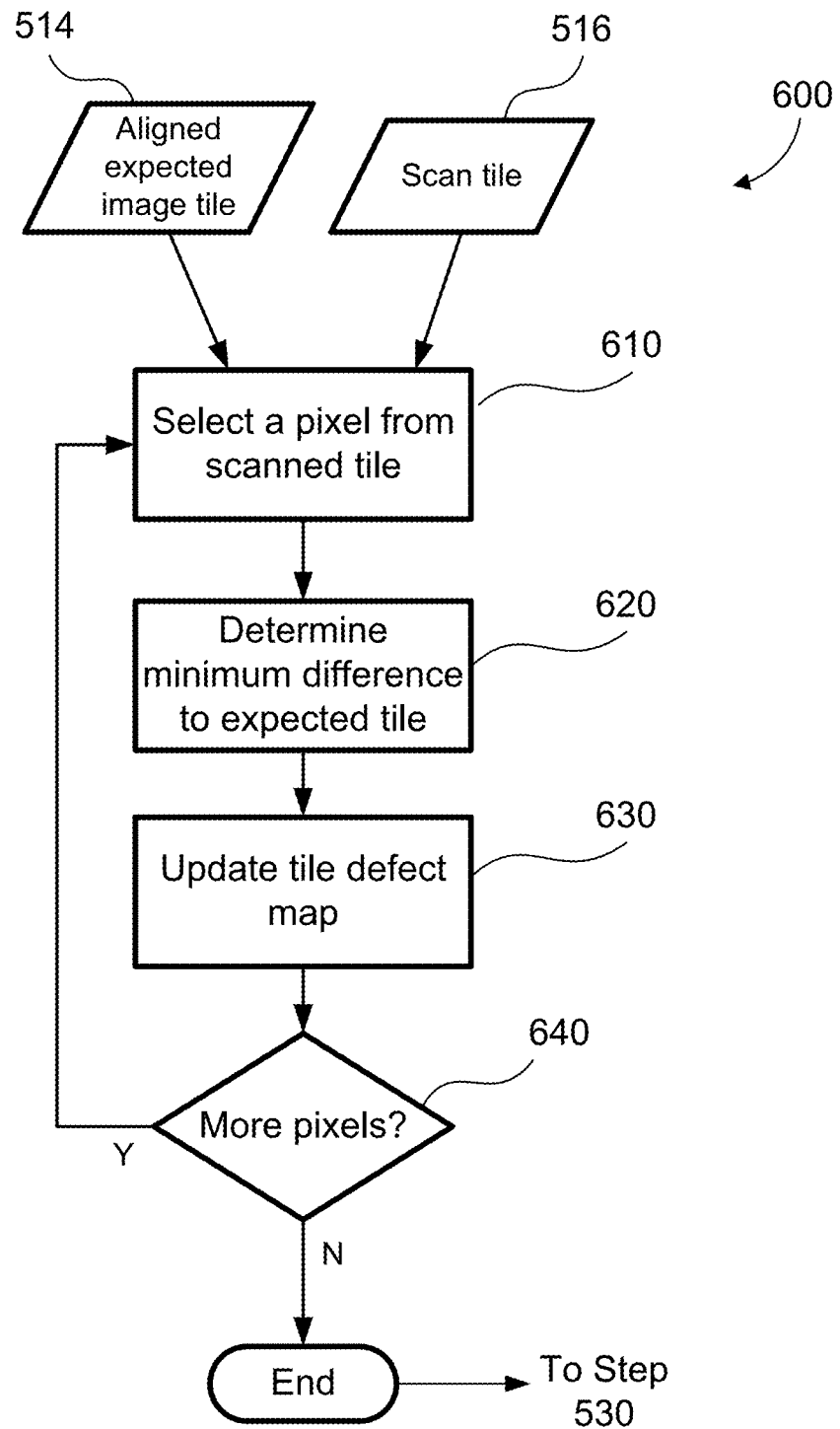
FIG. 6 is a flow-chart showing a method of comparing image tiles, as executed in the method of FIG. 5.

The method 500 of comparing image bands, as executed at step 270, will be described in greater detail with reference to FIG. 5. The method 500 may be executed by the processor 1406, as directed by the APV ASIC 1407 and/or one or more code modules of the software application program 1403 resident in the memory 1404. In accordance with the method 500, the processor 1406 operates on two image bands, being the scan band 235, and aligned expected image band 502.

Processing of the method 500 operates in a tile raster order, in which tiles are made available for processing from top-to-bottom and left-to-right in the band, one at a time. As seen in FIG. 5, the method 500 begins at step 510, where a Q×Q pixel tile is selected by the processor 1406 from each of the two bands 502, 235, with the tiles having corresponding positions in the respective bands 502, 235. The two tiles, namely an aligned expected image tile 514 and a scan tile 516, may be stored within the memory buffer 1404 and then processed in following step 520. In one arrangement, Q is equal thirty-two (32) pixels.

At update step 520, the processor 1406, as directed by the APV ASIC 1407 and/or the software application 1403, performs a comparison between the tiles 514 and 516 to identify print defects. A method 600 of comparing tiles of the image bands 502 and 235, as executed at step 520, will be described in greater detail with reference to FIG. 6.

The method 600 may be executed by the processor 1406, as directed by the APV ASIC 1407 and/or one or more code modules of the software application program 1403 resident in the memory 1404. The method 600 begins at selection step 610, where a scan pixel to be checked is selected by the processor 1406 from the scan tile 516.

In a next determining step 620, the minimum difference in a neighbourhood of the scan pixel selected at step 610 is determined by the processor 1406. Any suitable distance metric, D, may be used to determine the difference at step 620.

In one arrangement, the distance metric, D, may be a colour difference metric, $D_{RGB}(p,q)$. The colour difference metric, $D_{RGB}(p,q)$, may be used to determine colour difference for a single pixel. The colour difference metric used may be a Euclidean distance in RGB space, which for two pixels p and q is expressed in Equation [27], as follows:

$$D_{RGB}(p,q) = \sqrt{(p_r - q_r)^2 + (p_g - q_g)^2 + (p_b - q_b)^2} \quad [27]$$

where $p_r$, $p_g$, $p_b$ are red, green, and blue components of pixel p, and likewise components $q_r$, $q_g$, $q_b$, for pixel q.

In an alternative arrangement, the distance metric, D, used at step 620 is a Delta E distance metric, $D_{\Delta E}(p,q)$, which may be determined in accordance with Equation [28], as follows:

$$D_{\Delta E}(p,q) = \sqrt{(p_{L*}-q_{L*})^2+(p_{a*}-q_{a*})^2+(p_{b*}-q_{b*})^2} \quad [28]$$

The Delta E distance, $D_{\Delta E}(p,q)$, is defined using the L*a*b* colour space, which has a known conversion from the sRGB colour space. In one arrangement, the RGB values provided by image capture devices, such as the scanner 1408, may be sRGB values.

The minimum distance between a scan pixel $p_s$ at location x,y and nearby pixels in aligned expected image $p_e$, may be determined using the chosen distance metric D according to Equation [29], as follows:

$$D_{min}(p_s[x,y]) = \min_{\substack{x'=x-K_B \ldots x+K_B \\ y'=y-K_B \ldots y+K_B}} (D(p_s[x,y], p_e[x',y'])) \quad [29]$$

where $K_B$ is approximately half the neighbourhood size. In one arrangement, $K_B$, may be selected as one (1) pixel, giving a 3×3 neighbourhood.

In a next update step 630, a tile defect map, configured within memory buffer 1404, is updated by the processor 1406 at location x,y of the map based on the value of $D_{min}$. A pixel is determined to be defective if the $D_{min}$ value of the pixel is greater than a certain threshold, $D_{defect}$. In one arrangement where the Delta E distance metric, $D_{\Delta E}$, is used to determine $D_{min}$, the threshold $D_{defect}$ is set as ten (10).

In next decision step 640, if there are any more pixels left to process in the scan tile, the method 600 returns to the step 610. Otherwise, if no pixels are left to process, the method 600 is completed and control returns to a step 530 in the method 500 of FIG. 5.

Following execution of step 520, the tile-based defect map created in step 630 is stored in the defect map 165 in band defect map updating step 530. In a following decision step 540, if the processor 1406 determines that print defects existed when updating the band defect map in step 530, then the method 500 concludes as no further processing is necessary. Otherwise, the method 500 proceeds to step 550.

In one arrangement, the defect map 165 is a 2-dimensional map, which allows a user to determine where defects occurred in the output print 163. At a next decision step 550, if the processor 1406 determines that there are remaining tiles to be processed, then the method 500 continues at step 510 where a next set of tiles are selected. Otherwise, the method 500 concludes.

INDUSTRIAL APPLICABILITY

The arrangements described are applicable to the computer and data processing industries and particularly for image processing.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of selecting a plurality of patches within a region of a page, for use in image alignment, said method comprising:
    determining one or more candidate image alignment patches distributed across a region of the page, based on content in the page region, each candidate image alignment patch being associated with a feature strength value for use in aligning images of the page region;
    applying a distribution of grid nodes to the page region, at least one attribute of the distribution of grid nodes being dynamically adjusted according to the distribution of the candidate image alignment patches across the page region; and
    selecting a corresponding patch from the distribution of candidate image alignment patches for each of a plurality of the grid nodes, wherein each of the selected patches is selected based on proximity of the selected patch to a corresponding grid node.

2. The method according to claim 1, wherein each of the selected patches is selected based on feature strength value associated with the selected patch.

3. The method according to claim 1, wherein the at least one attribute includes the height of the distribution of grid nodes and the width of the distribution of grid nodes.

4. The method according to claim 1, wherein the number of grid nodes is dependent on a measure of local distortion.

5. The method according to claim 1, wherein the spacing between the grid nodes is dependent on a measure of local distortion.

6. The method according to claim 1, wherein the grid nodes are regularly distributed.

7. The method according to claim 1, wherein the distribution of the grid nodes within the page region is different compared to other page regions of the page, based on distribution of the candidate patches across the page region.

8. An apparatus for selecting a plurality of patches within a region of a page, for use in image alignment, said apparatus comprising:
    means for determining one or more candidate image alignment patches distributed across a region of the page, based on content in the page region, each candidate image alignment patch being associated with a feature strength value;
    means for applying a distribution of grid nodes to the page region, at least one attribute of the distribution of grid nodes being dynamically adjusted according to the distribution of the candidate image alignment patches across the page region; and
    means for selecting a corresponding patch from the distribution of candidate image alignment patches for each of a plurality of the grid nodes, wherein each of the selected patches is selected based on proximity of the selected patch to a corresponding grid node.

9. A system for selecting a plurality of patches within a region of a page, for use in image alignment, said system comprising:
    a memory for storing data and a computer program;
    a processor coupled to said memory for executing a computer program, said computer program comprising instructions for:
        determining one or more candidate image alignment patches distributed across a region of the page, based on content in the page region, each candidate image alignment patch being associated with a feature strength value;

applying a distribution of grid nodes to the page region, at least one attribute of the distribution of grid nodes being dynamically adjusted according to the distribution of the candidate image alignment patches across the page region; and selecting a corresponding patch from the distribution of candidate image alignment patches for each of a plurality of the grid nodes, wherein each of the selected patches is selected based on proximity of the selected patch to a corresponding grid node.

10. A non-transitory computer readable medium having a computer program recorded thereon for selecting a plurality of patches within a region of a page, for use in image alignment, said program comprising:

code for determining one or more candidate image alignment patches distributed across a region of the page, based on content in the page region, each candidate image alignment patch being associated with a feature strength value;

code for applying a distribution of grid nodes to the page region, at least one attribute of the distribution of grid nodes being dynamically adjusted according to the distribution of the candidate image alignment patches across the page region; and code for selecting a corresponding patch from the distribution of candidate image alignment patches for each of a plurality of the grid nodes, wherein each of the selected patches is selected based on proximity of the selected patch to a corresponding grid node.

11. A method of selecting a plurality of patches within a region of a page, for use in image alignment, said method comprising:

determining one or more candidate image alignment patches distributed across a region of the page, based on content in the page region, each candidate patch being associated with a feature strength value;

applying a distribution of grid nodes to the page region, at least one attribute of the distribution of grid nodes being dynamically adjusted according to the distribution of the candidate patches across the page region; and selecting a corresponding patch from the distribution of candidate patches for each of a plurality of the grid nodes, each of the selected patches being selected based on proximity of the selected patch to a corresponding grid node, wherein the distribution of the grid nodes within the page region is different compared to other page regions of the page.

* * * * *